(12) United States Patent
Lavi et al.

(10) Patent No.: US 7,840,400 B2
(45) Date of Patent: **\*Nov. 23, 2010**

(54) DYNAMIC NATURAL LANGUAGE UNDERSTANDING

(75) Inventors: Ofer Lavi, Jerusalem (IL); Gadiel Auerbach, Jerusalem (IL); Eldad Persky, Jerusalem (IL)

(73) Assignee: Intelligate, Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 11/562,142

(22) Filed: Nov. 21, 2006

(65) Prior Publication Data

US 2007/0112556 A1    May 17, 2007

Related U.S. Application Data

(62) Division of application No. 10/097,537, filed on Mar. 13, 2002, now Pat. No. 7,216,073.

(60) Provisional application No. 60/275,598, filed on Mar. 13, 2001.

(51) Int. Cl.
G06F 17/28 (2006.01)

(52) U.S. Cl. ........................................ 704/9

(58) Field of Classification Search ............... 704/9
See application file for complete search history.

(56) References Cited

U.S. PATENT DOCUMENTS

| | | |
|---|---|---|
| 4,706,212 A | 11/1987 | Toma |
| 5,128,865 A | 7/1992 | Sadler |
| 5,299,125 A | 3/1994 | Baker et al. |
| 5,321,608 A | 6/1994 | Namba et al. |
| 5,528,491 A | 6/1996 | Kuno et al. |
| 5,541,836 A | 7/1996 | Church et al. |
| 5,576,954 A | 11/1996 | Driscoll |
| 5,634,024 A | 5/1997 | Yamaguchi |
| 5,642,502 A | 6/1997 | Driscoll |
| 5,675,710 A | 10/1997 | Lewis |
| 5,677,993 A | 10/1997 | Ohga et al. |
| 5,680,511 A | 10/1997 | Baker et al. |
| 5,694,592 A | 12/1997 | Driscoll |
| 5,748,974 A | 5/1998 | Johnson |
| 5,805,775 A | 9/1998 | Eberman et al. |
| 5,844,302 A | 12/1998 | Hain et al. |
| 5,893,092 A | 4/1999 | Driscoll |

(Continued)

FOREIGN PATENT DOCUMENTS

EP    0962873 A1    12/1999

(Continued)

OTHER PUBLICATIONS

Mitchell, Tom M., "Bayesian Learning", *Machine Learning*, Chapter 6, pp. 154-200, MIT Press and McGraw-Hill Publishing, 1997.

(Continued)

*Primary Examiner*—Susan McFadden
(74) *Attorney, Agent, or Firm*—Occhiuti Rohlicek & Tsao LLP

(57) ABSTRACT

Methods and systems for dynamic natural language understanding. A hierarchical structure of semantic categories is exploited to assist in the natural language understanding. Optionally, the natural language to be understood includes a request.

20 Claims, 13 Drawing Sheets

U.S. PATENT DOCUMENTS

| | | | |
|---|---|---|---|
| 5,895,466 A | 4/1999 | Goldberg et al. | |
| 5,918,222 A | 6/1999 | Fukui et al. | |
| 5,960,394 A | 9/1999 | Gould et al. | |
| 5,987,404 A | 11/1999 | Della Pietra et al. | |
| 5,991,712 A | 11/1999 | Martin | |
| 6,029,123 A | 2/2000 | Suda et al. | |
| 6,035,338 A | 3/2000 | Hirakawa et al. | |
| 6,038,527 A | 3/2000 | Renz | |
| 6,088,692 A | 7/2000 | Driscoll | |
| 6,092,034 A | 7/2000 | McCarley et al. | |
| 6,138,085 A | 10/2000 | Richardson et al. | |
| 6,161,083 A | 12/2000 | Franz et al. | |
| 6,167,369 A | 12/2000 | Schulze | |
| 6,199,034 B1* | 3/2001 | Wical | 704/9 |
| 6,311,152 B1 | 10/2001 | Bai et al. | |
| 6,675,159 B1 | 1/2004 | Lin et al. | |
| 6,839,671 B2 | 1/2005 | Attwater et al. | |
| 6,928,407 B2 | 8/2005 | Ponceleon et al. | |
| 6,938,024 B1 | 8/2005 | Horvitz | |
| 6,941,266 B1* | 9/2005 | Gorin et al. | 704/257 |
| 7,158,935 B1* | 1/2007 | Gorin et al. | 704/257 |
| 7,181,438 B1* | 2/2007 | Szabo | 707/2 |
| 7,216,073 B2* | 5/2007 | Lavi et al. | 704/9 |
| 2001/0009009 A1 | 7/2001 | Iizuka | |

FOREIGN PATENT DOCUMENTS

| | | |
|---|---|---|
| WO | WO98/09288 | 3/1998 |
| WO | WO99/14743 | 3/1999 |
| WO | WO00/75863 A2 | 12/2000 |

OTHER PUBLICATIONS

Noord et al., "Robust Grammatical Analysis for Spoken Dialogue Systems", *Natural Language Engineering 1*, vol. 1, pp. 1-48, 1998.

Tan et al., Text Retrieval for Document Images Based on N-Gram Algorithm:, PRICAI 2000: *Workshop on Text and Web Mining* pp. 1-12, Aug. 2000.

* cited by examiner

FIG. 2

DYNAMIC NATURAL LANGUAGE UNDERSTANDING

This application is a divisional of application Ser. No. 10/097,537 filed Mar. 13, 2002 now U.S. Pat. No. 7,216,073, which, under 35 U.S.C. 119, claims the priority date of Mar. 13, 2001 of provisional application 60/275,598, all of which are incorporated herein by reference.

FIELD OF THE INVENTION

This invention relates to natural language understanding.

BACKGROUND OF THE INVENTION

Natural language understanding systems and methods traditionally use strict grammar or statistics.

Grammar based natural language understanding systems and methods typically use a parser to parse a text into a tree, i.e. a hierarchical ("depth") structure. Elements of the trees are processed in a hierarchical manner, either bottom up or top down. In order to achieve successful understanding of the text, the sentence structure/grammar generally needs to conform to rules, thereby placing constraints on the freedom of expression of the submitter of the text.

Statistically based natural language understanding systems and methods typically use many statistical methods including classification to understand a text. Freedom of expression by the submitter of the text is therefore enhanced.

Systems of the related art include the following:

U.S. Pat. No. 5,680,511 to Baker, et al. in one aspect, provides word recognition systems that operate to recognize an unrecognized or ambiguous word that occurs within a passage of words. The system can offer several words as choice words for inserting into the passage to replace the unrecognized word. The system can select the best choice word by using the choice word to extract from a reference source, sample passages of text that relate to the choice word. For example, the system can select the dictionary passage that defines the choice word. The system then compares the selected passage to the current passage, and generates a score that indicates the likelihood that the choice word would occur within that passage of text. The system can select the choice word with the best score to substitute into the passage. The passage of words being analyzed can be any word sequence including an utterance, a portion of handwritten text, a portion of typewritten text or other such sequence of words, numbers and characters. Alternative embodiments of the present invention are disclosed which function to retrieve documents from a library as a function of context.

U.S. Pat. No. 5,642,519 to Martin provide a unified grammar for a speech interpreter capable of real-time speech understanding for user applications running on a general purpose microprocessor-based computer. The speech interpreter includes a unified grammar (UG) compiler, a speech recognizer and a natural language (NL) processor. The UG compiler receives a common UG lexicon and unified grammar description, and generates harmonized speech recognition (SR) and NL grammars for the speech recognizer and natural language processor, respectively. The lexicon includes a plurality of UG word entries having predefined characteristics, i.e., features, while the UG description includes a plurality of complex UG rules which define grammatically allowable word sequences. The UG compiler converts the complex UG rules (complex UG rules include augmentations for constraining the UG rules) into permissible SR word sequences and SR simple rules (simple rules do not include any augmentation) for the SR grammar. The SR grammar is a compact representation of the SR word entries corresponding to the UG word entries, permissible SR word sequences and simple SR rules corresponding to the augmentations of the complex UG rules. The NL grammar provides the NL processor with NL patterns enabling the NL processor to extract the meaning of the validated word sequences passed from the speech recognizer.

U.S. Pat. No. 5,991,712 also to Martin teaches that improved word accuracy of speech recognition can be achieved by providing a scheme for automatically limiting the acceptable word sequences. Speech recognition systems consistent with the present invention include a lexicon database with words and associated lexical properties. The systems receive exemplary clauses containing permissible word combinations for speech recognition, and identify additional lexical properties for selected words in the lexicon database corresponding to words in the received exemplary clauses using lexical property tests of a grammar database. Certain lexical property tests are switchable to a disabled state. To identify the additional lexical properties, the exemplary clauses are parsed with the switchable lexical property tests disabled to produce an index of the lexical properties corresponding to the exemplary clauses. The lexicon database is updated with the identified additional lexical properties by assigning the lexical properties to the corresponding words of the lexicon database. The grammar database is compiled with the lexical property tests enabled and the lexicon database with the assigned lexical properties to produce a grammar that embodies constraints of the lexical property tests and the lexical properties.

U.S. Pat. No. 5,918,222 to Fukui, et al. teaches a data storage means for storing data in a predetermined information form. An information retrieval means retrieves the data stored in the data storage means. A reception means receives an information disclosure demand from a demander, a response rules storage means for storing general knowledge for generating a response responding to the demander and a personal relationship information associated with a unique personal relationship between a user having the data on an information provider side and a user on an information demander side. A response plan formation means, responsive to the demand received by the reception means, plans a response for exhibiting, to the information demander, data obtained by causing the retrieval means to retrieve the data stored in the data storage means on the basis of the knowledge and the personal relationship information stored in the response rule storage means. A response generation means generates the response to the information demander in accordance with the plan formed by the response plan formation means.

U.S. Pat. No. 5,987,404 to Della Pietra, et. al. proposes using statistical methods to do natural language understanding. The key notion is that there are "strings" of words in the natural language, that correspond to a single semantic concept. One can then define an alignment between an entire semantic meaning (consisting of a set of semantic concepts), and the English. This is modeled using P(E,A|S). One can model p(S) separately. This allows each parameter to be modeled using many different statistical models.

U.S. Pat. No. 5,576,954 to Driscoll teaches a procedure for determining text relevancy and can be used to enhance the retrieval of text documents by search queries. This system helps a user intelligently and rapidly locate information found in large textural databases. A first embodiment determines the common meanings between each word in the query and each word in the document. Then an adjustment is made for words in the query that are not in the documents. Further, weights are calculated for both the semantic components in the query and the semantic components in the documents. These weights are multiplied together, and their products are subsequently added to one another to determine a real value number (similarity coefficient) for each document. Finally, the documents are sorted in sequential order according to their real value number from largest to smallest value. Another, embodiment is for routing documents to topics/headings (sometimes referred to as filtering). Here, the importance of each word in both topics and documents are calculated. Then, the real value number (similarity coefficient) for each document is determined. Then each document is routed one at a time according to their respective real value numbers to one or more topics. Finally, once the documents are located with their topics, the documents can be sorted. This system can be used to search and route all kinds of document collections, such as collections of legal documents, medical documents, news stories, and patents.

U.S. Pat. No. 5,642,502 also to Driscoll teaches a system and method for retrieving relevant documents from a text data base collection comprised of patents, medical and legal documents, journals, news stores and the like. Each small piece of text within the documents such as a sentence, phrase and semantic unit in the data base is treated as a document. Natural language queries are used to search for relevant documents from the data base. A first search query creates a selected group of documents. Each word in both the search query and in the documents are given weighted values. Combining the weighted values creates similarity values for each document which are then ranked according to their relevant importance to the search query. A user reading and passing through this ranked list checks off which documents are relevant or not. Then the system automatically causes the original search query to be updated into a second search query which can include the same words, less words or different words than the first search query. Words in the second search query can have the same or different weights compared to the first search query. The system automatically searches the text data base and creates a second group of documents, which as a minimum does not include at least one of the documents found in the first group. The second group can also be comprised of additional documents not found in the first group. The ranking of documents in the second group is different than the first ranking such that the more relevant documents are found closer to the top of the list.

U.S. Pat. No. 5,893,092 also to Driscoll teaches a search system and method for retrieving relevant documents from a text data base collection comprised of patents, medical and legal documents, journals, news stories and the like. Each small piece of text within the documents such as a sentence, phrase and semantic unit in the data base is treated as a document. Natural language queries are used to search for relevant documents from the data base. A first search query creates a selected group of documents. Each word in both the search query and in the documents are given weighted values. Combining the weighted values creates similarity values for each document which are then ranked according to their relevant importance to the search query. A user reading and passing through this ranked list checks off which documents are relevant or not. Then the system automatically causes the original search query to be updated into a second search query which can include the same words, less words or different words than the first search query. Words in the second search query can have the same or different weights compared to the first search query. The system automatically searches the text data base and creates a second group of documents, which as a minimum does not include at least one of the documents found in the first group. The second group can also be comprised of additional documents not found in the first group. The ranking of documents in the second group is different than the first ranking such that the more relevant documents are found closer to the top of the list.

U.S. Pat. No. 6,088,692 also to Driscoll teaches a natural language search system and method for retrieving relevant documents from a text data base collection comprised of patents, medical and legal documents, journals, news stories and the like. Each small piece of text within the documents such as a sentence, phrase and semantic unit in the data base is treated as a document. Natural language queries are used to search for relevant documents from the data base. A first search query creates a selected from relevant documents. Each word in both the search query and in the documents are given weighted values. Combining the weighted values creates similarity values for each document which are then ranked according to their relevant importance to the search query. A user reading and passing through this ranked list checks off which document are relevant or not. Then the system automatically causes the original search query to be updated into a second search query which can include the same words, less words or different words than the first search query. Words in the second search query can have the same or different weights compared to the first search query. The system automatically searches the text data base and creates a second group of documents, which as a minimum does not include at least one of the documents found in the first group. The second group can also be comprised of additional documents not found in the first group. The ranking of documents in the second group is different than the first ranking such that the more relevant documents are found closer to the top of the list.

U.S. Pat. No. 5,694,592 also to Driscoll teaches a procedure for determining text relevancy that can be used to enhance the retrieval of text documents by search queries. This system helps a user intelligently and rapidly locate information found in large textural databases. A first embodiment determines the common meanings between each word in the query and each word in the document. Then an adjustment is made for words in the query that are not in the documents. Further, weights are calculated for both the semantic components in the query and the semantic components in the documents. These weights are multiplied together, and their products are subsequently added to one another to determine a real value number (similarity coefficient) for each document. Finally, the documents are sorted in sequential order according to their real value number from largest to smallest value. Another, embodiment is for routing documents to topics/headings (sometimes referred to as faltering). Here, the importance of each word in both topics and documents are calculated. Then, the real value number (similarity coefficient) for each document is determined. Then each document is routed one at a time according to their respective real value numbers to one or more topics. Finally, once the documents are located with their topics, the documents can be sorted. This system can be used to search and route all kinds of document collections, such as collections of legal documents, medical documents, news stories, and patents.

U.S. Pat. No. 6,138,085 to Richardson, et al. teaches a facility for determining, for a semantic relation that does not occur in a lexical knowledge base, whether this semantic relation should be inferred despite its absence from the lexical knowledge base. This semantic relation to be inferred is preferably made up of a first word, a second word, and a relation type relating the meanings of the first and second words. In a preferred embodiment, the facility identifies a salient semantic relation having the relation type of the semantic relation to be inferred and relating the first word to an intermediate word other than the second word. The facility then generates a quantitative measure of the similarity in meaning between the intermediate word and the second word. The facility further generates a confidence weight for the semantic relation to be inferred based upon the generated measure of similarity in meaning between the intermediate word and the second word. The facility may also generate a confidence weight for the semantic relation to be inferred based upon the weights of one or more paths connecting the first and second words.

U.S. Pat. No. 5,675,710 to Lewis teaches a method and apparatus for training a text classifier. A supervised learning system and an annotation system are operated cooperatively to produce a classification vector which can be used to classify documents with respect to a defined class. The annotation system automatically annotates documents with a degree of relevance annotation to produce machine annotated data. The degree of relevance annotation represents the degree to which the document belongs to the defined class. This machine annotated data is used as input to the supervised learning system. In addition to the machine annotated data, the supervised learning system can also receive manually annotated data and/or a user request. The machine annotated data, along with the manually annotated data and/or the user request, are used by the supervised learning system to produce a classification vector. In one embodiment, the supervised learning system comprises a relevance feedback mechanism. The relevance feedback mechanism is operated cooperatively with the annotation system for multiple iterations until a classification vector of acceptable accuracy is produced. The classification vector produced by the invention is the result of a combination of supervised and unsupervised learning.

U.S. Pat. No. 6,311,152 to Bai, et. al teaches a system (100, 200) for tokenization and named entity recognition of ideographic language. In the system, a word lattice is generated for a string of ideographic characters using finite state grammars (150) and a system lexicon (240). Segmented text is generated by determining word boundaries in the string of ideographic characters using the word lattice dependent upon a contextual language model (152A) and one or more entity language models (152B). One or more named entities is recognized in the string of ideographic characters using the word lattice dependent upon the contextual language model (152A) and the one or more entity language models (152B). The contextual language model (152A) and the one or more entity language models (152B) are each class-based language models. The lexicon (24) includes single ideographic characters, words, and predetermined features of the characters and words.

What is needed in the art is a method and system for understanding natural language that includes inter alia statistical steps and elements which also take advantage of hierarchical-structure. What is also needed in the art is a system and method where the extraction of one part of a text which belongs to one semantic category assists in the extraction of another part which belongs to a semantic category of a different hierarchical level. In addition, what is needed in the art is a method and system for understanding natural language where later steps of the process are affected based on the results of earlier steps, thereby introducing a dynamic aspect to the method and system.

SUMMARY OF THE INVENTION

According to the present invention, there is provided a method for use in a method for understand a natural language text, comprising performing the following selectively in a statistical manner: attempting to extract at least one value belonging to a semantic category from a natural language text or a form thereof; and if a result of the attempting complies with a predetermined criterion, attempting to extract, based on the result, at least one value belonging to another semantic category of a different hierarchical level than the semantic category, else performing at least one action from a group of actions including: asking a submitter of the text a question whose content depends on the result and giving up on understanding the natural language text.

In one embodiment, the predetermined criterion is at least one from a group including: at least one value for the semantic category was extracted, only one value for the semantic category was extracted, one of the at least one value extracted for the semantic category is selected based on a grade thereof, a correct number of values for the semantic category were extracted, a correct number of values for the semantic category are selected based on grades thereof from among the at least one value extracted for the semantic category, at least some values belonging to other previously extracted at least one semantic category are appropriate for at least one value extracted for the semantic category, values belonging to other previously extracted at least one semantic category are appropriate for only one value extracted for the semantic category, the semantic category is a particular semantic category where an unlimited number of extracted values is allowed, it is desired to process in parallel more than one extracted value for the semantic category, there is a default value corresponding to each required value for the semantic category which was not extracted, there is only one possible value for the semantic category, and there is only a correct number of possible values for the semantic category.

According to the present invention, there is also provided, a method for understanding a natural language text, comprising: receiving a natural language text; processing each at least two semantic categories, the each on a different hierarchical level, by performing the following selectively in a statistical manner: (i) attempting to determine at least one value belonging to the each semantic category through extraction, wherein if the each semantic category is not a first processed of the at least two semantic categories, then the attempting is based on results of previously processed semantic categories, and (ii) if the each semantic category is not a last processed of the at least two semantic categories and a result of the attempting does not comply with a predetermined criterion, dialoging with a submitter of the text and receiving at least one answer from the submitter, wherein at least one value determined from the at least one answer augments the result so as to comply with the predetermined criterion and allow extraction attempts for other of the at least two semantic categories to be subsequently processed; and evaluating values determined for the at least two semantic categories with respect to one another to determine whether the values are sufficient to understand the text, and if the values are not sufficient: dialoging with the submitter, receiving at least one answer from the submitter, determining from the at least one answer at least one value belonging to at least one of the at least two semantic categories, the at least one value in conjunction with earlier determined values being sufficient to understand the text.

According to the present invention there is further provided a method for training at least two classifiers to understand a natural language text, comprising: introducing entries into a database, the entries belonging to at least two semantic categories of different hierarchical levels; defining examples of natural language texts, wherein at least some of the examples include embedded syntactic tokens based on the entries; and training at least two classifiers for the at least two semantic categories using the examples or a form thereof.

According to the present invention, there is provided a module for use in a system for natural language understanding, comprising: at least one classifier or pseudo classifier configured to extract values belonging to a semantic category from a natural language text or a form thereof; and an action resolver configured if a result of extracting values of the semantic category complies with a predetermined criterion to employ based on the result at least one classifier or pseudo classifier to extract values belonging to another semantic category of a different hierarchical level, and configured if the result does not comply with a predetermined criterion to perform at least one action from a group of actions including: employing based on the result a dialog management module and giving up on understanding the natural language text.

According to the present invention, there is also provided: a system for natural language understanding, comprising: at least two classifiers or pseudo classifiers configured to extract values belonging to at least two semantic categories on different hierarchical levels from a natural language text or a form thereof; a dialog management module configured to dialog with a submitter of the natural language text; at least one evaluation module configured to evaluate values belonging to the at least two semantic categories; and an action resolver configured to cause the text to be understood by (i) employing, if a result of extracting values of a semantic category complies with a predetermined criterion and the semantic category is not a last to be processed semantic category, a classifier or pseudo classifier based on the result to extract values belonging to another semantic category, by (ii) employing, if the result does not comply with a predetermined criterion and the semantic category is not a last to be processed semantic category, a dialog management module and then employing, based on the result as augmented by at least one answer received from the submitter by the dialog management module, a classifier or pseudo classifier to extract values belonging to another semantic category, and by (iii) employing the evaluation module to evaluate the values of the at least two semantic categories in relation to one another in order to determine if the values are sufficient to understand the text and if the values are not sufficient employing the dialog management module to determine at least one value, the at least one value in conjunction with the values being sufficient to understand the text.

According to the present invention, there is further provided a system for training classifiers for natural language understanding, comprising: a real time database including entries related to semantic categories on at least two different hierarchical levels; classifiers for the semantic categories; and a knowledge work tool configured to develop syntactic tokens from the entries, embed the tokens in examples and train the classifiers at least partially on the examples.

According to the present invention there is still further provided a method for understanding a natural language text, comprising performing the following in a selectively statistical manner: receiving a natural language text; extracting at least one parameter value from the text or a form thereof; identifying at least one parameter type related to each extracted parameter value; providing at least one restatement of the received text, each at least one restatement having embedded within, at least one of the identified parameter types; extracting at least one overall category value from the at least one restatement or a form thereof; selecting a subcategory extractor corresponding to one of the extracted at least one overall category, and using the selected subcategory extractor to extract at least one subcategory value; choosing one of the at least one extracted subcategory values; evaluating the at least one identified parameter type in relation to the chosen subcategory value; and concluding that the natural language text is understood.

According to the present invention, there is yet further provided system for understanding a natural language text, comprising: one classifier configured to extract an overall category value from a natural language text or a form thereof; a different classifier corresponding to each overall category value configured to extract subcategory values from a natural language text or a form thereof; one classifier configured to extract parameter values from a natural language text or a form thereof; a dialog management module configured to dialog with a submitter of the natural language text; at least one evaluation component configured to evaluate extracted values; and an action resolve configured to employ different parts of the system in turn in order to understand the natural language text, including employing the one classifier for parameter values before the one overall category classifier and employing the overall category classifier before the corresponding subcategory classifier.

According to the present invention, there is provided a program storage device readable by machine, tangibly embodying a program of instructions executable by the machine to perform method steps for use in a method for understanding a natural language text, comprising performing the following selectively in a statistical manner: attempting to extract at least one value belonging to a semantic category from a natural language text or a form thereof; and if a result of the attempting complies with a predetermined criterion, attempting to extract, based on the result, at least one value belonging to another semantic category of a different hierarchical level than the semantic category, else performing at least one action from a group of actions including: asking a submitter of the text a question whose content depends on the result and giving up on understanding the natural language text.

According to the present invention, there is also provided a computer program product comprising a computer useable medium having computer readable program code embodied therein for use in a computer program product comprising: computer readable program code for causing the computer to perform the following selectively in a statistical manner: computer readable program code for causing the computer to attempt to extract at least one value belonging to a semantic category from a natural language text or a form thereof; and computer readable program code for causing the computer if a result of the attempting complies with a predetermined criterion to attempt to extract, based on the result, at least one value belonging to another semantic category of a different hierarchical level than the semantic category, else performing at least one action from a group of actions including: asking a submitter of the text a question whose content depends on the result and giving up on understanding the natural language text.

According to the present invention, there is further provided a program storage device readable by machine, tangibly embodying a program or instruction executable by the machine to perform method steps for understanding a natural language text, comprising: receiving a natural language text; processing each at least two semantic categories, the each on a different hierarchical level, by performing the following selectively in a statistical manner; (i) attempting to determine at least one value belonging to the each semantic category through extraction, wherein if the each semantic category is not a first processed of the at least two semantic categories, then the attempting is based on results of previously processed semantic categories, and (ii) if the each semantic category is not a last processed of the at least two semantic categories and a result of the attempting does not comply with a predetermined criterion, dialoging with a submitter of the text and receiving at least one answer from the submitter, wherein at least one value determined from the at least one answer augments the result so as to comply with the predetermined criterion and allow extraction attempts for other of the at least two semantic categories to be subsequently processed; and evaluating values determined for the at least two semantic categories with respect to one another to determine whether the values are sufficient to understand the text, and if the values are not sufficient; dialoging with the submitter, receiving at least one answer from the submitter, determining from the at least one answer at least one value belonging to at least one of the at least two semantic categories, the at least value in conjunction with earlier determined values being sufficient to understand the text.

According to the present invention, there is still further provided a computer program product comprising a computer useable medium having computer readable program code embodied therein for understanding a natural language text, the computer program product comprising: computer readable program code for causing the computer to receive a natural language text; computer readable program code for causing the computer to process each at least two semantic categories, the each on a different hierarchical level, by performing the following selectively in a statistical manner: computer readable program code for causing the computer to (i) attempt to determine at least one value belonging to the each semantic category through extraction, wherein if the each semantic category is not a first processed of the at least two semantic categories, then the attempting is based on results of previously processed semantic categories, and computer readable program code for causing the computer to (ii) if the each semantic category is not a last processed of the at least two semantic categories, and a result of the attempting does not comply with a predetermined criterion, dialog with a submitter of the text and receive at least one answer from the submitter, wherein at least one value determined from the at least one answer augments the result so as to comply with the predetermined criterion and allow extraction attempts for other of the at least two semantic categories to be subsequently processed; and computer readable program code for causing the computer to: evaluate values determined for the at least two semantic categories with respect to one another to determine whether the values are sufficient to understand the text, and if the values are not sufficient: dialog with the submitter, receive at least one answer from the submitter, determine from the at least one answer at least one value belonging to at least one of the at least two semantic categories, the at least one value in conjunction with earlier determined values being sufficient to understand the text.

According to the present invention, there is provided a program storage device readable by machine, tangibly embodying a program of instructions executable by the machine to perform method steps for training at least two classifiers to understand a natural language text, comprising: introducing entries into a database, the entries belonging to at least two semantic categories of different hierarchical levels; defining examples of natural language texts, wherein at least some of the examples include embedded syntactic tokens based on the entries; and training at least two classifiers for the at least two semantic categories using the examples or a form thereof.

According to the present invention there is also provided a computer program product comprising a computer useable medium having computer readable program code embodied therein for training at least two classifiers to understand a natural language text, the computer program product comprising: computer readable program code for causing the computer to introduce entries into a database, the entries belonging to at least two semantic categories of different hierarchical levels; computer readable program code for causing the computer to define examples of natural language texts, wherein at least some of the examples include embedded syntactic tokens based on the entries; and computer readable program code for causing the computer to train at least two classifiers for the at least two semantic categories using the examples or a form thereof.

According to the present invention, there is further provided a program storage device readable by machine, tangibly embodying a program of instructions executable by the machine to perform method steps for understanding a natural language text, comprising performing the following in a selectively statistical manner: receiving a natural language text; extracting at least one parameter value from the text or a form thereof; identifying at least one parameter type related to each extracted parameter value; providing at least one restatement of the received text, each at least one restatement having embedded within, at least one of the identified parameter types; extracting at least one overall category value from the at least one restatement or a form thereof; selecting a subcategory extractor corresponding to one of the extracted at least one overall category, and using the selected subcategory extractor to extract at least one subcategory value; choosing one of the at least one extracted subcategory values; evaluating the at least one identified parameter type in relation to the chosen subcategory value; and concluding that the natural language text is understood.

According to the present invention there is yet further provided, a computer program product comprising a computer useable medium having computer readable program code embodied therein for understanding a natural language text, the computer program product comprising: computer readable program code for causing the computer to perform the following in a selectively statistical manner: computer readable program code for causing the computer to receive a natural language text; computer readable program code for causing the computer to extract at least one parameter value from the text or a form thereof; computer readable program code for causing the computer to identify at least one parameter type related to each extracted parameter value; computer readable program code for causing the computer to provide at least one restatement of the received text, each at least one restatement having embedded within, at least one of the identified parameter types; computer readable program code for causing the computer to extract at least one overall category value from the at least one restatement or a form thereof; computer readable program code for causing the computer to select a subcategory extractor corresponding to one of the extracted at least one overall category, and use the selected subcategory extractor to extract at least one subcategory value; computer readable program code for causing the computer to choose one of the at least one extracted subcategory values; computer readable program code for causing the computer to evaluate the at least one identified parameter type in relation to the chosen subcategory value; and computer readable program code for causing the computer to conclude that the natural language text is understood.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 2 is a sample screen of a knowledge base work tool, according to a preferred embodiment of the present invention;

DETAILED DESCRIPTION OF THE INVENTION

The preferred embodiment relates to a system and method for understanding natural language.

In certain preferred embodiments of the present invention, the natural language to be understood includes a request. However, the invention is not limited to understanding requests and also applies to understanding natural language inputs which do not include a request.

All examples given below are non-limiting illustrations of the invention described and defined herein.

Figure 1:
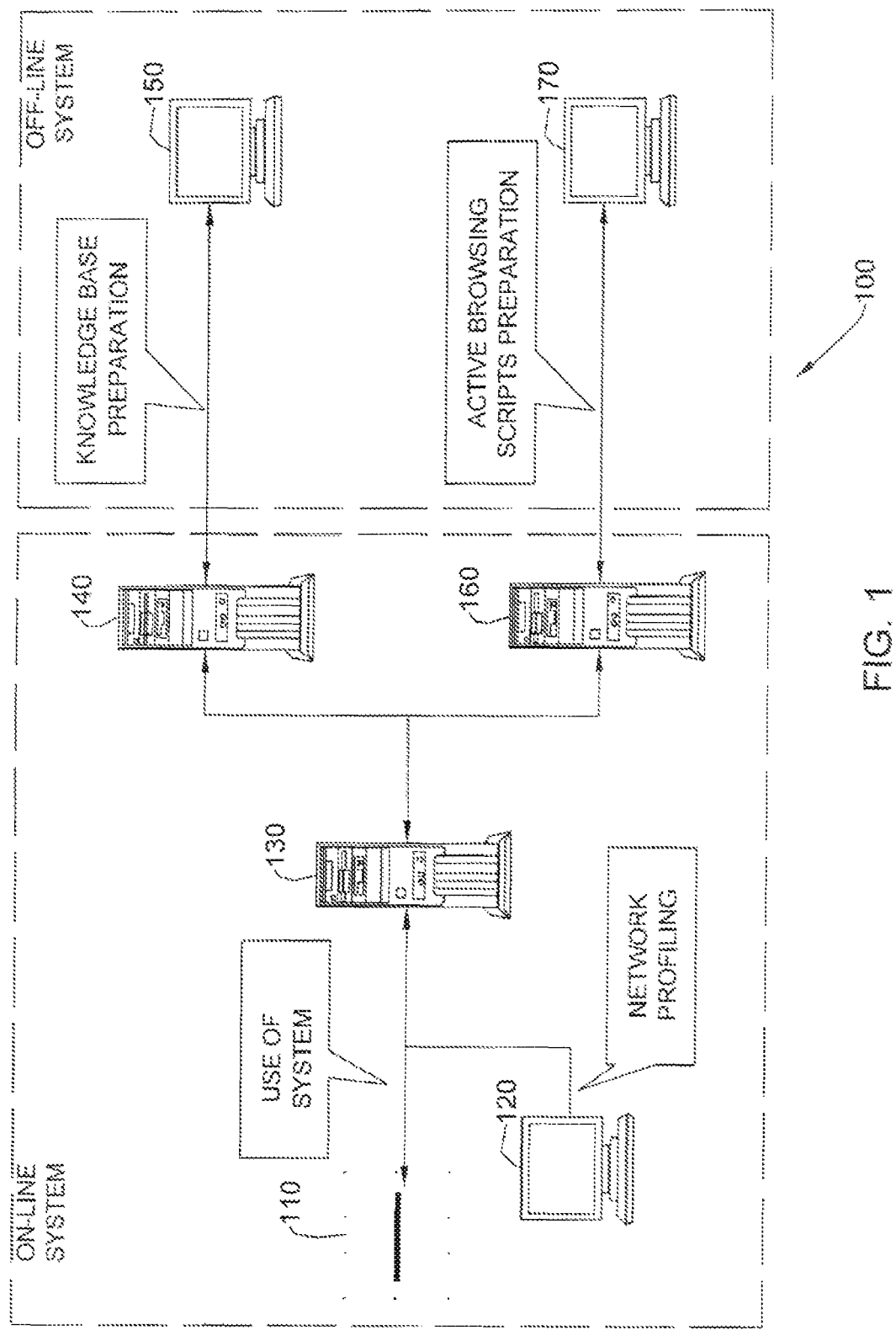
FIG. 1 is a block diagram of a system for understanding a natural language input and optionally executing a request included therein, according to a preferred embodiment of the present invention.

FIG. 1 is an example of a block diagram of a system 100 for understanding natural language and if the natural language includes a request, optionally executing the request, according to a preferred embodiment of the present invention. System 100 assumes remote access through a network, such as the Internet, but it should be evident that local access is within the scope of the invention.

It is assumed that a user input natural language through a client 110. Client 110 is shown here as a Laptop Computer however it should be evident that client 110 can be any input device, for example computers, PDAs (Personal Digital Assistants), phones, cellular phones, cellular phones with SMS or WAP capabilities, fax, scanner, etc. Depending on the type of client 110 used, pre-handling of the input may be necessary, for example speech to text conversion, optical character recognition etc. These pre-handling techniques are well known in the art. An optional network profiler 120 manages remote networks (not shown), controlling network properties as well as the inflow and outflow of requests to and from the remote systems. An optional control server 130 manages the connection between client 110 and the rest of system 100, and also the internal connections within the rest of system 100.

Figure 2:
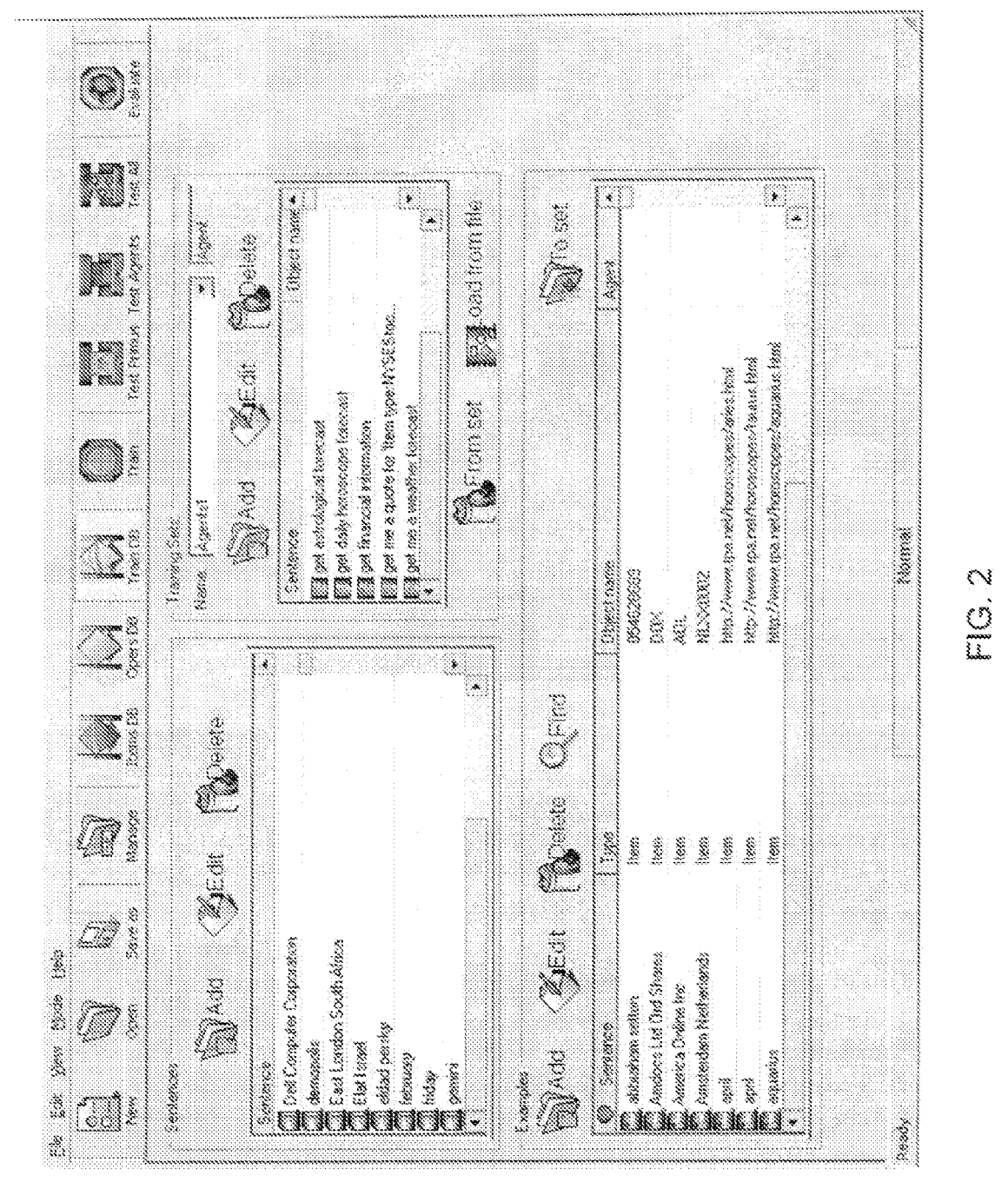

A natural language understanding (NLU) server 140 includes the software for understanding the natural language. In order for the software on NLU server 140 to be able to comprehend the natural language, a preparation stage is necessary which includes for example the implementation of training activity. The preparation stage can be conducted, for example, using a knowledge builder work tool 150. A sample screen of work tool 150 is shown in FIG. 2.

Figure 3:
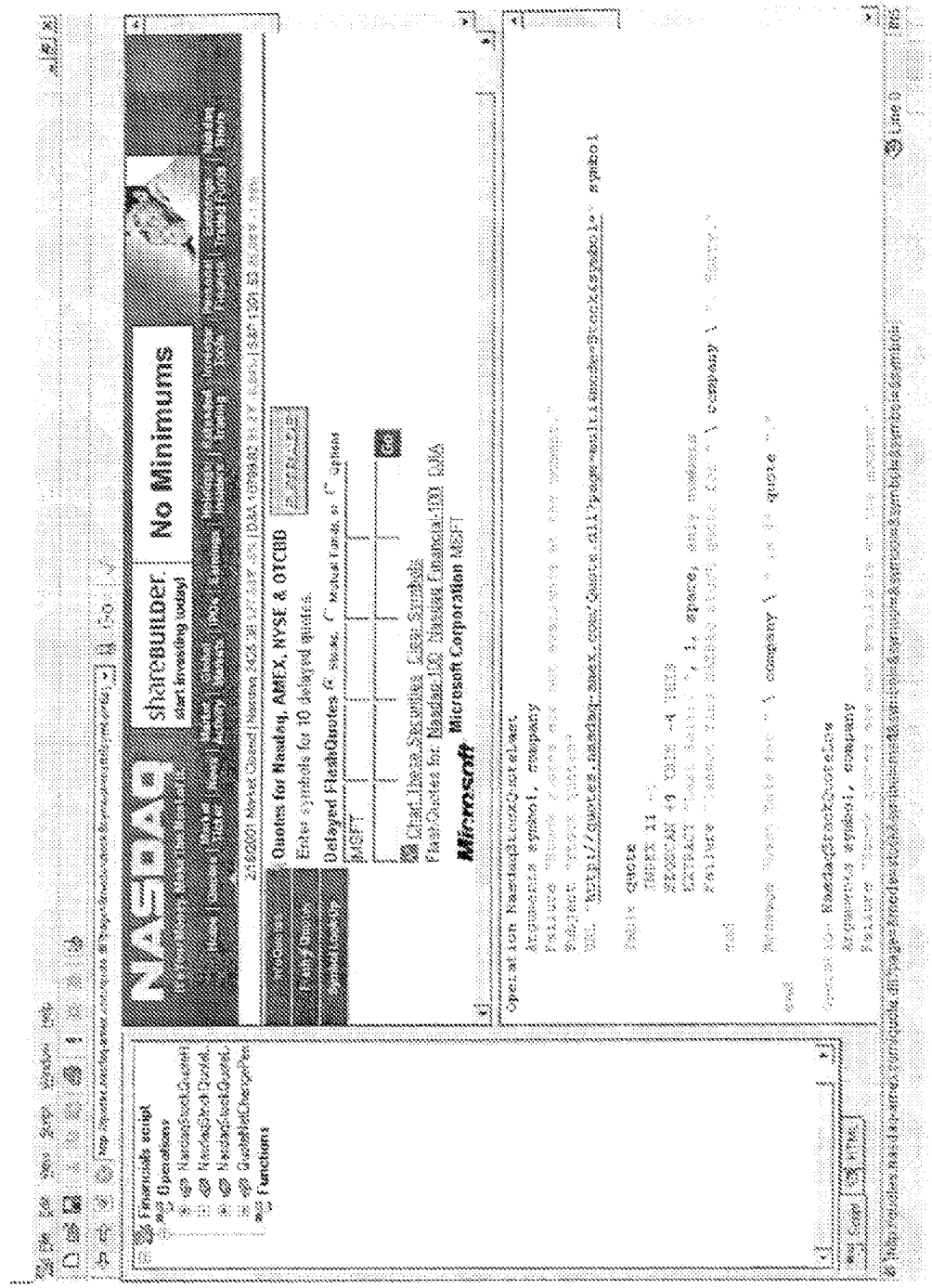
FIG. 3 is a sample screen showing the processing of an active browsing script according to a preferred embodiment of the present invention.

Assuming that the input is a natural language request, a request implementation server 160, allows the implementation of the understood request. For example if request implementation server 160 is an active browsing server, implementation can occur through control of Interact sites automatically during runtime. In one preferred embodiment, every request supported by system 100 is represented by a script code of several lines that defines how and where the request should be carried out. The active browsing script can be prepared, for example, using an active browsing studio work tool 170. FIG. 3 shows a sample script screen of the processing of an active browsing script so as to carry out the request. (Browsing work tool 170 in some preferred embodiments may also be used in building a real time database 445 as explained below with reference to FIG. 11).

In a non-network system, NLU server 140 and request implementation server 160 in certain preferred embodiments are replaced by natural language understanding (NLU) module 140 and request implementation module 160, respectively. NLU module or server 140 and request implementation server or module 160 in certain preferred embodiments are separately implemented so that for example, NLU module/server 140 can be used with another means of request implementation or even with no request implementation means. For example, even if the natural language is assumed to include a request, the request may be understood without being implemented. In preferred embodiments where the user input is not a request, request implementation means may be unnecessary.

Similarly, in certain preferred embodiments, other means of natural language understanding could be used instead of NLU module/server 140 in a system with request implementation module/server 160. In other preferred embodiments, NLU module/server 140 and implementation module/server 160 can be integrated into one unit or separated into more than two units.

For the purposes of the description below the term "module" as in NLU module and request implementation module is assumed to refer to both modules and servers, which may form part of network or non-network systems.

Figure 4:
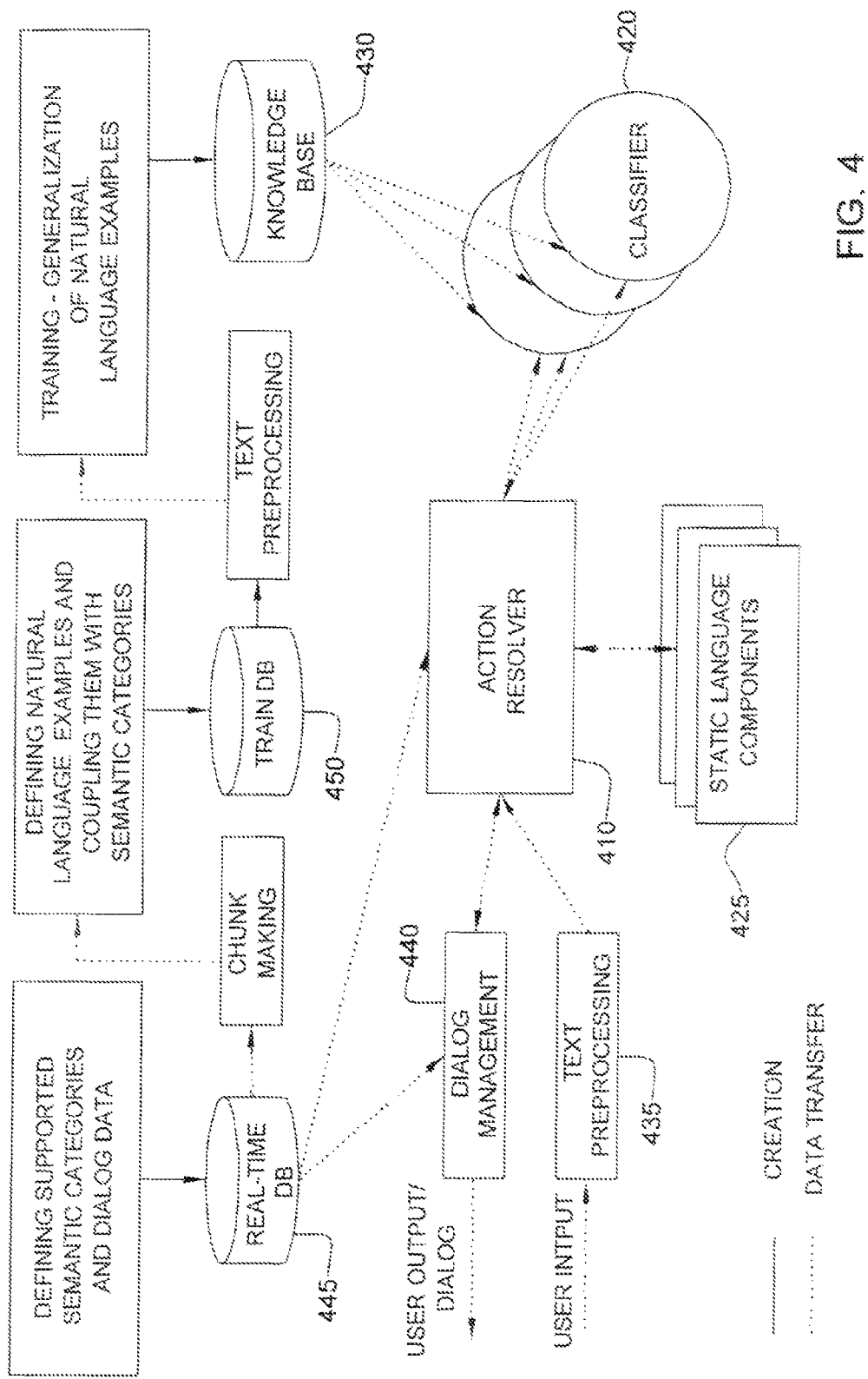
FIG. 4 is a block diagram of a module for understanding a natural language text, according to a preferred embodiment of the present invention.

FIG. 4 shows an example of NLU module 140, according to a preferred embodiment of the present invention. It should be evident that the modules shown in FIG. 4 as forming part of NLU module 140 and discussed below can be integrated or divided into a smaller or larger number of modules. The actual separation of the functions of NLU module 140 into the modules shown in FIG. 4 is for ease of understanding only. In one preferred embodiment of the invention, the modules shown on the bottom of FIG. 4 are associated with the online (i.e. using) stage and the modules shown on the top of FIG. 4 are associated with the offline (training) stage. FIG. 4 is discussed below in conjunction with flow charts illustrating the methods for using and training module 140. The order of the steps in one or more of the methods illustrated in the flow chart may be varied in other preferred embodiments. In other preferred embodiments, some steps in one or more of the methods in the flow charts may be omitted and/or additional steps may be added.

Figure 5:
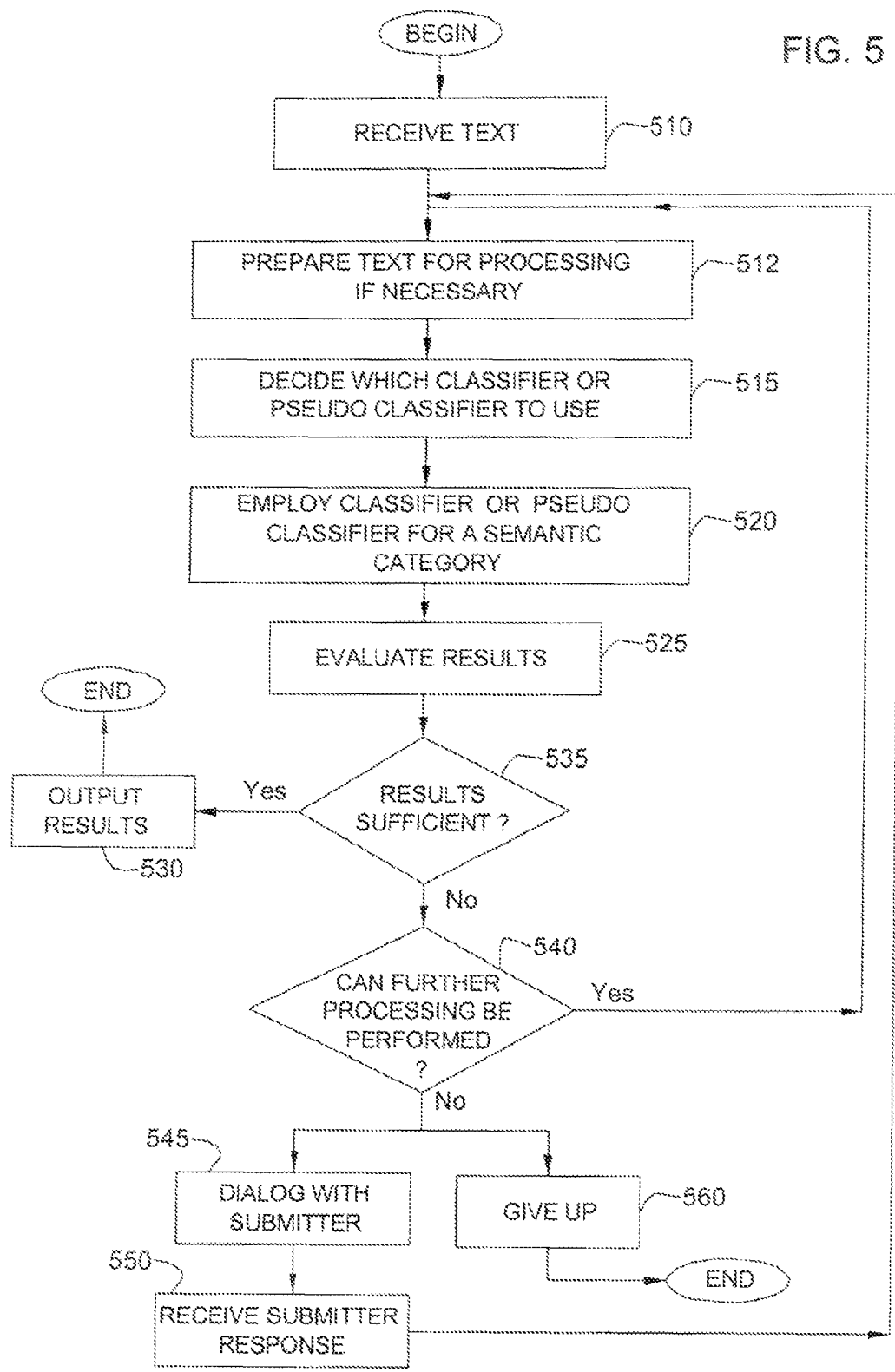
FIG. 5 is a flow chart of a method for understanding a natural language text, according to a preferred embodiment of the present invention.

An example of the overall method for understanding the submission from a user is shown in FIG. 5, according to a preferred embodiment of the present invention. The method shown in FIG. 5 enables understanding of the text, without compelling the text to comply to a pre-defined grammar.

User input is received (step 510) from a submitter, for example through client 110. As mentioned above, input can optionally include a request. It is assumed that any necessary pre-handling of the input has already been performed as explained above so that the input is received by module 140 in a format compatible with module 140. In one preferred embodiment, the format is ASCII. Herein below, once the input has been pre-handled to a format compatible with module 140, the input is also referred to as "text".

The next step is preparing the text, if necessary, for processing (step 512) using a text pre-preprocessing module 435. An action resolver module 410 decides which classifier module (also sometimes termed extractor) 420 or pseudo-classifier static component 425 to employ (step 515). Each classifier or group of classifiers 420 extracts vales belonging to a different semantic category. One or more pseudo-classifier static components 425 extract phrases that can not be learned or do not need to be learned (as will be explained further below) belonging to one or more semantic categories. Selected classifier 420 or pseudo classifier static component 425 is employed on the text (step 520), and the results of the extraction are evaluated by action resolver 410 (step 525), as will be described below. If the results of selected classifier 420 are sufficient to understand the text (i.e. it is concluded that the text is understood) (step 535), the results are optionally output (for example to the submitter, or to control server 130 and from there to request implementation module 160) in step 530. Outputting the results is one possible way of indicating that the text is understood. Alternatively, other indications of understanding can be used, for example an indication that a request optionally included in the input was implemented.

If the results are insufficient to understand the text at this stage, but based on the results, a further extraction can be performed by a classifier 420 or pseudo classifier 425 (step 540), action resolver 410 prepares the text, if necessary, for further extraction (step 512) and action resolver 410 chooses the next classifier 420 or the next pseudo classifier 425 for the next semantic category to extract (step 515). Alternatively, a further extraction may not be able to be performed and the results are insufficient to understand the text. This situation may occur, for example, if one or more of classifiers 420 could not classify the text into any one of the possible semantic meanings that classifier 420 knows. In this case, NLU module 140 may be considered to have failed to understand the text and may stop any further processing (step 560). The results of the failure can be optionally communicated to the submitter. Alternatively and more preferably, action resolver module 410 may dialog with the submitter in step 545, and receive submitter response in step 550. Once the response is received a further extraction may be performed on the submitter response in step 520 using the classifier 420 or pseudo classifier 425 for the same semantic category, or a classifier 420/pseudo classifier 425 for another previously extracted semantic category.

It should be noted that the method described above with reference to FIG. 5 includes some steps performed in a selectively statistical manner. For example, when a classifier 420 is used in step 520, the step is a statistically based step, whereas when a pseudo classifier 425 is used in step 520, the step is typically non-statistically based.

Classifiers are well known in the art. An example of a public domain algorithm which can be used by classifiers 420 of this invention includes Naive-bayes text-classification developed by Carnegie Mellon University and available on the world wide web at www.cs.cmu.edu/afs/cs/project/theo-11/www/naive-bayes.html. This public domain algorithm is based on "Machine Learning" by Tom Mitchell, Chapter p6, McGraw Hill 1997, ISBN 0070428077.

A pseudo classifier is a type of static component 425. Pseudo classifiers do not need to be trained. Non limiting examples of pseudo classifiers 425 include time extractors and currency extractors, which detect and extract time phrases and currency phrases respectively. In certain preferred embodiments, a data structure for time is used which keeps values for seconds, minutes, days, months, years, etc. Time extractors can therefore translate phrases such as "next Tuesday" into next Tuesday's date, or translate phrases like "for three days", "every Sunday" etc. In certain preferred embodiments, the data structure for money is in the form of #x,yy, where x is an integer and yy is any number between 00 and 99 and # can be replaced by any currency type. Pseudo classifiers such as time and currency extractors may in some cases be based on limited strict grammars, suitable only for specific time or money expressions, and may use well known parsing methods for detecting and parsing the temporal expressions (time-phrases) or currency phrases. In these preferred embodiments, the parsing may be partial and include a part of the given text that could be parsed based on the limited grammars and later transformed to a data structure that can hold the time or currency expressions. An example of grammar based temporal expression parsing (which as well known in the art can be easily modified for currency phrases) can be found at odur.let.rug.nl/"vannoord/papers/yearbook/node2.html as a part of a work called "Grammatical Analysis in a Spoken Dialogue System" by Gosaae Bourma, Rob Koeling, Mark-Jan Nederhof and Gertjan Van Noord.

A semantic category should be understood for the purpose of the description below to be a grouping of values including at least one common property which distinguishes those values from values in other semantic categories that are defined for a particular embodiment.

In preferred embodiments of the present invention, there is a hierarchical structure among the semantic categories which is exploited when understanding the text. In certain preferred embodiments, there are three semantic categories: overall category (highest level), subcategory (medium level), and parameter values (lowest level). As an example one or more classifier 420 or pseudo classifiers 425 may extract value(s) belonging to the overall category. The overall category value in this example can be considered the domain or topic of interest of the text. Continuing with the example, one or more classifier 420 or pseudo classifiers 425 may extract value(s) belonging to the subcategory of the overall category, such as operations related to the overall topic of interest. Continuing with the same example, one or more classifier 420 or pseudo classifiers 425 may extract parameter value(s). In successful extractions for certain preferred embodiments, the extracted parameter values are of the parameter types required by the extracted subcategory value. In this example, the subcategory values share the common property of being subcategory values of overall category values, whereas overall category values share the common property of having subcategory values. Also in this example, parameter values share the common property of having corresponding parameter types which can be accepted by subcategory values, whereas subcategory values share the common property of typically accepting parameter values of particular parameter types (It should be noted that in some cases no parameter types are defined for a particular subcategory value).

In other preferred embodiments, there may be fewer or more semantic categories in a hierarchical structure. For example, there may be an overall category, a pre-subcategory, a subcategory, and parameter values.

In some preferred embodiments, the text may include more than one subtext (for example more than one request) with each subtext represented by a separate hierarchical structure that can be processed either in parallel or sequentially. For the sake of simplicity, it is assumed below that the text can be represented by a single hierarchical structure.

It should be noted that the example given above of a possible hierarchical structure (i.e. overall category such as domain as the highest level, subcategory such as operation as the medium level, and parameter values as the lowest level) conforms with one conceptual view (as implemented typically be a system analyst-see below FIG. 11). In other words, if the following words were presented: currency conversion, banking, depositing, checks, and dollars, a common conceptual view would classify banking as belonging to the highest level category (domain), currency conversion and depositing as belonging to the middle level category (operations), and checks and dollars as belonging to the lowest level category (parameter values). As another example, out of the following words: studying, teaching, school, books and tests, school would be considered by many to belong to the highest level category, studying and teaching to the middle level category and books and tests to the lowest level category. The hierarchical structure used in other preferred embodiments are by no means bound to this conceptual view and may embrace other conceptual views.

Figure 6:
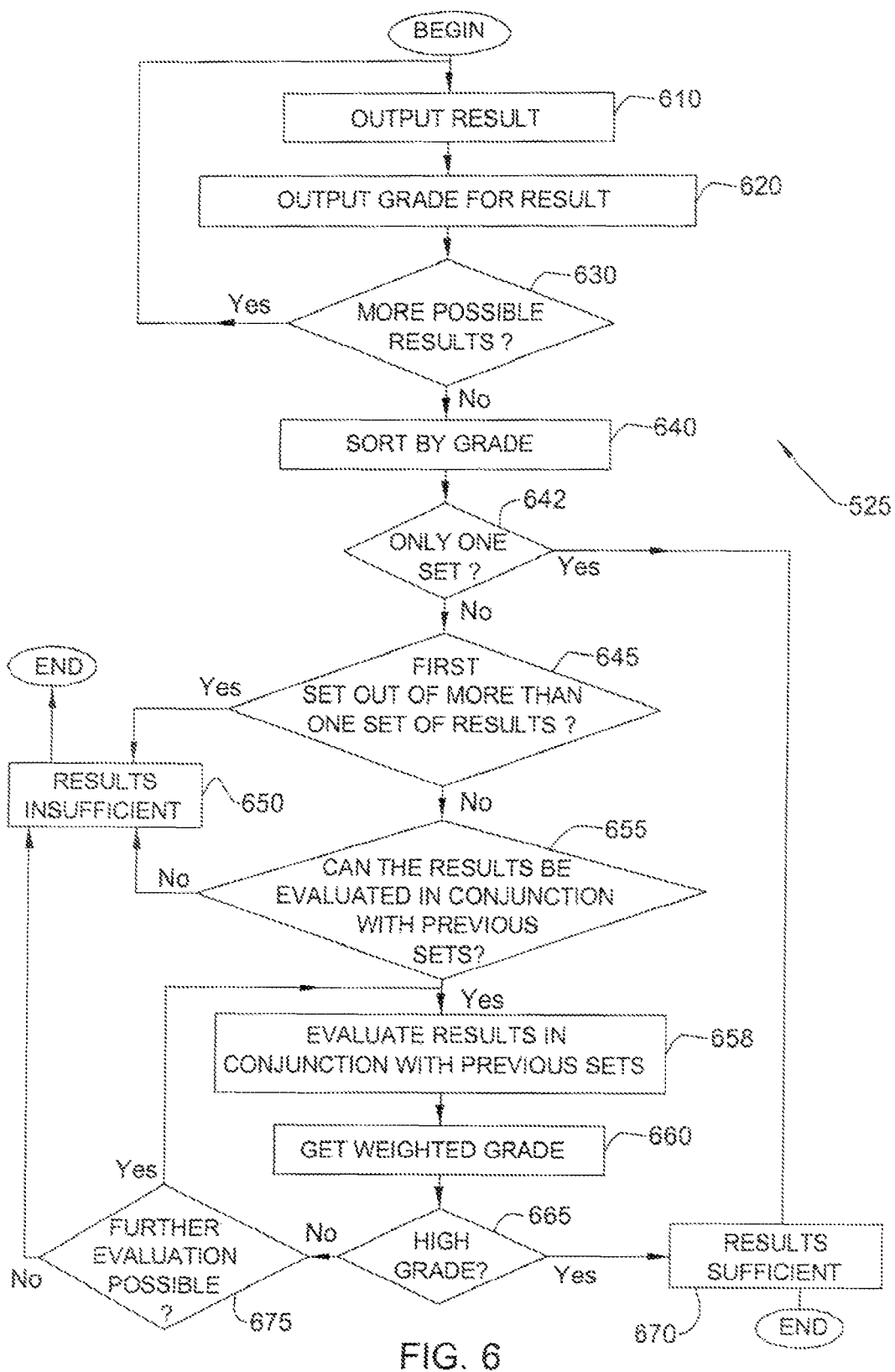
FIG. 6 is a flow chart of a method for evaluating extraction results, according to a preferred embodiment of the present invention.

FIG. 6 illustrates a preferred embodiment of a method for evaluating results of the extraction by classifier 420 (corresponding to step 525 of FIG. 5). In the earlier step 520 of FIG. 5, classifier 420 for a given semantic category searches a knowledge base 430 using the text prepared for extraction. (Details on how knowledge base 430 is developed will be explained below). Classifier 420 returns one or more possible matches (step 610) and a grade for each match (step 620). Grading is preferably performed by classifier 420 based on the training undergone by classifier 420 during the preparation of knowledge-base 430. The process iterates in step 630 until all matches and grades of the matches are output. In other preferred embodiments, not all matches are output but only matches that meet certain criteria, for example the highest graded matches, the most clustered matches, etc. For example, if clustered matches are to be output, matches whose grades are within a small range are identified and considered relevant. Continuing with the example, if these are ten results whose grade are {9, 8.3, 8.1, 7.9, 6.2, 6.1, 6, 4 and 1.2}, the two clustered groups of matches correspond to {8.3 to 7.8} and {6.2 to 6}. The outputted matches may in this example be those which correspond to the higher cluster {8.3 to 7.8}, perhaps together with other outputted matches, for example the match corresponding to the highest grade 9.

The matches are sorted by grade in step 640. Generally, all matches are stored until no longer needed, i.e. until subsequent processing, for example further extractions, dialoging with submitters, etc. tenders the match unlikely to be the correct match. In other preferred embodiments, the matches may be stored until the final results are output in step 530.

If the results are for the first semantic category extracted and more than one semantic category exists, then the results are considered insufficient to understand the text in step 650 (i.e. a 'no' answer to step 535). If there is only one existing semantic category (step 642) then the results are considered sufficient in step 670 (i.e. a 'yes' answer to step 535). If the results are for subsequent extracted semantic categories, but the results can not be evaluated in conjunction with results from previous semantic category extractions then the results are considered insufficient in step 650 (corresponding to a 'no' answer to step 535). An example of a situation where the results can not be evaluated in conjunction with previous results is if the current extracted semantic category value(s) is not directly related to any of the previously extracted category value(s). To illustrate the example, assume the overall category value extracted is "financial operation" and the only two possible subcategory values for this overall category value are "get a stock quote" and "buy stocks". If neither of these subcategory values are extracted, but instead the subcategory value "get a horoscope forecast" is extracted, then the results are considered insufficient because the extracted values for the overall category and subcategory are not related to each other.

If on the other hand, the results can be evaluated in conjunction with results from previous semantic category extractions, then the results are evaluated in conjunction with the results from the previous sets (step 658). For example, the evaluation can determine whether the results for the current semantic category correspond to the results from previous semantic category extractions (see below FIG. 7 for more details on a possible evaluation process). If no weighted grade is to be calculated, then if the results are sufficient to understand the text, the method proceeds directly to step 670 (corresponding to a 'yes' answer to step 535). Otherwise, if no weighted grade is to be calculated and the results are insufficient, the method proceeds directly to step 650 (corresponding to a 'no' answer to step 535). The results may be considered sufficient to understand the text, for example, if all required values for each semantic category are known and the values for the different semantic categories correspond with one another.

In alternative preferred embodiments, in step 645 if the results are not for the last extracted semantic category, then the results are considered insufficient in step 650. In these embodiments, only when the results are for the last extracted semantic category does the method continue with step 655 where a decision is made on whether evaluation in conjunction with results from previous semantic category extractions is feasible.

In alternative preferred embodiments, the meaning of the text is guessed at prior to extracting all semantic categories and/or a final conclusion on a value of a semantic category is reached prior to completing an evaluation of results of that semantic category in conjunction with previously extracted semantic categories (In other words, in these embodiments the threshold of "sufficiency" is lower).

Continuing with the illustrated preferred embodiment, once the results from all semantic categories are available, an optional weighted grade may be calculated in step 660 as a final text of the combination of results from the different semantic categories. The weighted grade is derived using a formula which takes into account the grades achieved by the current results and the previous semantic category results. For example, the formula could be an average with either equal weight for each semantic category or different weights for each semantic category. Continuing with the example, in preferred embodiments which include an overall category and subcategory one possible formula might assign the overall category a weight of 2 and the subcategory a weight of 1. If the weighted grade is high then the results are considered sufficient in step 670 (corresponding to a 'yes' answer to step 535). If the weighted grade is not high enough then if further evaluation i.e. of other combinations of results from the different semantic categories is possible, more evaluation are performed in step 658. If no further evaluation of other combinations are possible than the results are considered insufficient in step 650 (corresponding to a 'no' answer to step 535).

In some preferred embodiments, pseudo classifier 425 results are also graded. For example the time extractor may in some preferred embodiments return the results in a sequence of decreasing probability. In certain preferred embodiments with pseudo classifier graded results, the results may be evaluated in conjunction with other results as described in the method of FIG. 6. In other preferred embodiments, pseudo classifiers return either a Boolean true if a match was extracted, or a Boolean false if no match was extracted, without any grading.

Figure 7A:
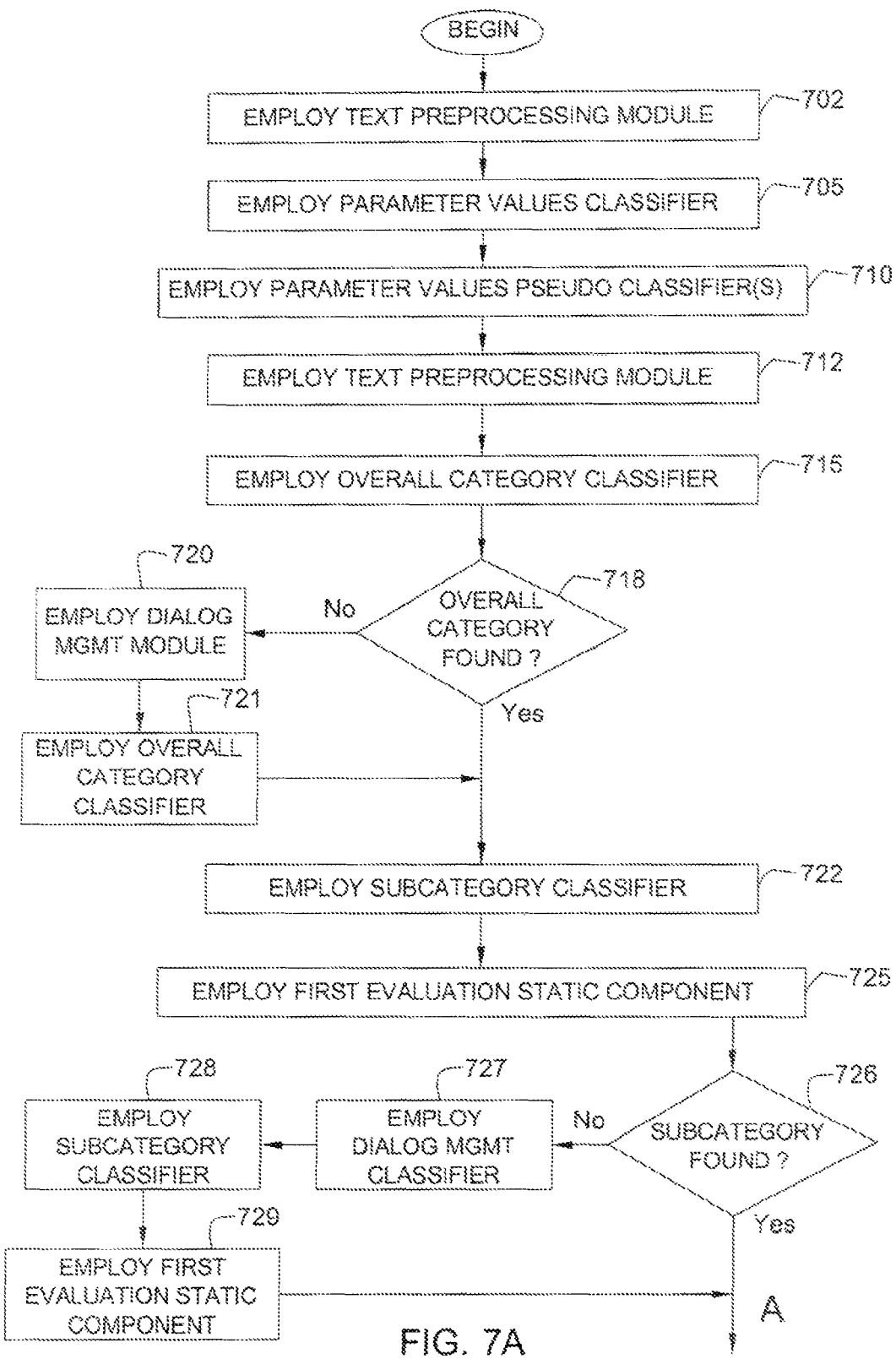
FIGS. 7*a* and 7*b* show a sequence for employing different modules of the natural language module, according to a preferred embodiment of the present invention.
Figure 7B:
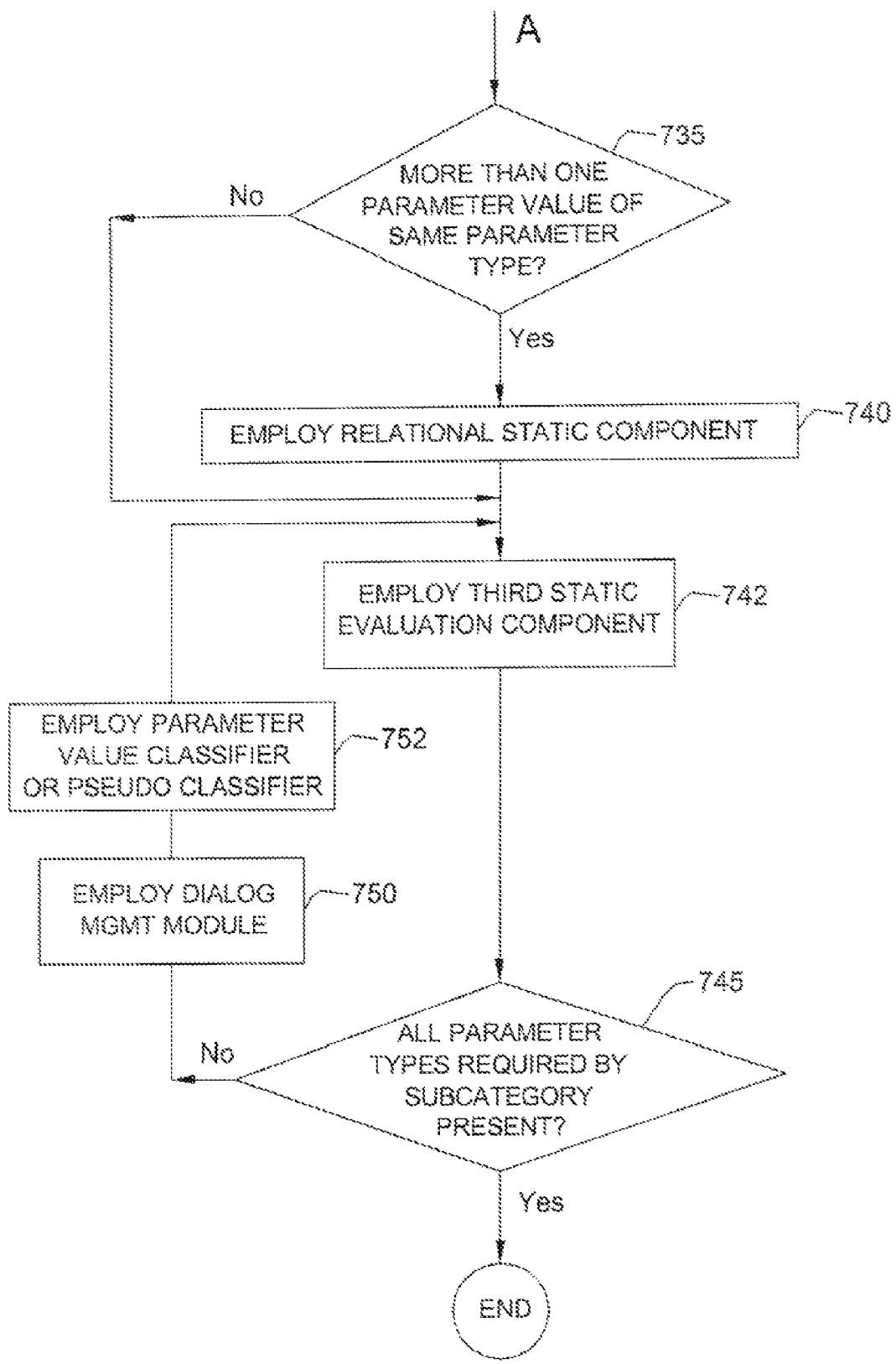

FIG. 7 illustrates in more detail a preferred embodiment of a possible sequence followed by action resolver 410 in turning to different modules of natural language module 140 in order to implement the method of FIG. 5. In the preferred embodiment illustrated in FIG. 7, action resolver 410 is for example a state automation. Assume for the sake of the example hierarchical semantic categories including overall category, subcategory and parameter values. The sequence shown in FIG. 7, processes the semantic categories in an order which takes advantage of the hierarchy of the semantic categories, so that results of a semantic category of a certain hierarchical level helps in the processing of a semantic category of another hierarchical level. Specifically in this example there is assumed to be one classifier 420 for the overall category, a separate subcategory classifier 420 associated with each overall category value, one parameter values classifier 420, and one or more parameter values pseudo classifiers 425. Continuing with the example, parameter values, belonging to the lowest level semantic category, are extracted first. At least some of the results of the parameter values extraction are used to embed tokens into the text for overall category extraction, i.e. the highest level semantic category, and for subcategory extraction, i.e. the medium level semantic category. The results of the overall category extraction is used to select a subcategory classifier, i.e. the medium level semantic category. The hierarchical structure of the semantic categories is therefore advantageous to the overall processing.

As the sequence (other than the dynamic features to be discussed below) is pre-programmed by the designer of natural language understanding module 140, the sequence shown in FIG. 7 is one of many examples of possible sequences.

First, text preprocessing module 435 is employed (step 702 corresponding to step 512). Next, parameter values classifier 420 is employed (step 705 corresponding to step 520). Real time database 445 is used to identify the one or more possible corresponding parameter type(s) for each extracted parameter value. Then, parameter values pseudo classifier(s) 425 is employed (step 710 corresponding to step 520) and corresponding parameter types are identified. Afterwards, text preprocessing module 435 is again employed in preparation for overall classifier 420 (step 712 corresponding to step 512).

Next, overall category classifier 420 is employed (step 715 corresponding to step 520). Optionally (not shown), extracted overall category values can be evaluated in relation to extracted parameter values, for example by employing a first evaluation static component 425 to check if the parameter types of the extracted parameter values are in sync with subcategory values associated with the extracted overall category values.

If no overall category value is found, dialog management module 440 is employed (step 720 corresponding to step 545). If the overall category value is ambiguous (i.e. more than one possibility), then in some preferred embodiments, dialog management module 440 is employed, but in other preferred embodiments, a corresponding subcategory classifier 420 is employed for each of the possible overall category values. If dialog management module 440 has been employed, overall category classifier 420 is again employed to check the response received from the submitter (step 721 corresponding to step 520). Alternatively, if the response is obvious and does not need to be understood (for example the response is a selection of a multiple choice option) then overall classifier 420 does not need to be employed to check the response and step 721 may be skipped.

Examples of situations when the method can proceed directly from step 718 to step 722 (without dialoging) include inter-alis; when only one overall category value is extracted, when there is a default overall category value for the particular embodiment, when there is only one overall category value for a particular embodiment, when more than one overall category value was extracted but the parameter types of the extracted parameter values point to one of the extracted overall category values or to subcategory values associated with one of the extracted overall category values, when more than one overall category value was extracted but one overall category value can be selected based on the grades of the extracted overall category values, and when it is decided to process more than one extracted overall category value in parallel and employ a corresponding subcategory classifier for more than one overall category values.

Corresponding subcategory classifier 420 is employed (step 722 corresponding to step 520). Evaluations are then performed (corresponding to step 658 of FIG. 6) using evaluation static specific components 425.

First specific static component 425 for evaluation is employed which evaluates all the results of the previous extractions by extractors 420 and pseudo extractors 425 (step 725). First specific evaluation static component 425 checks extracted parameter values against extracted subcategory value(s) to see if the parameter values (for example based on the identified parameter types) are suitable for the extracted subcategory value(s). For example for each extracted subcategory value, first evaluation component 425 may match the parameter type(s) identified for each extracted parameter value with the parameter types expected for the extracted subcategory value as predefined in real time database 445. The matching in this example, may result in some expected parameter types (as predefined) not matched with any extracted parameter values, matched with exactly one parameter value, or matched with more than one extracted parameter value.

If based on this evaluation no suitable subcategory value is found dialog management module 440 is employed (step 727 corresponding to step 545). Once dialog management module 440 has been employed, sub-category classifier 420 is again employed to check the response received from the submitter (step 728 corresponding to step 520). Alternatively, if the response is obvious and does not need to be understood (for example the response is a selection of a multiple choice option) then sub-category classifier 420 does not need to be employed to check the response and step 728 may be skipped. First specific evaluation static component 425 is again employed in step 729.

Examples of situation when the method can continue directly from step 726 to step 735 (without dialoging) include inter-alia: when only one subcategory value is extracted, when no subcategory value is extracted but there is a default subcategory value corresponding to the overall category value, when there is only one pre-defined subcategory value corresponding to the overall category value, when there is more than one extracted subcategory value but the parameter types of the extracted parameter values point to one of the extracted subcategory values, and when there is more than one extracted subcategory value but one subcategory value can be selected based on the grades of the extracted subcategory values.

In cases where more than one parameter value of the same parameter type are defined for the subcategory value and at least one parameter value of that same parameter type was extracted (step 735), a second specific static evaluation (relational) component 425 is employed. Relationship evaluation component 425 evaluates the correspondence between the at least one extracted parameter value and the more than one parameter value defined for the subcategory value (step 740). For example if two names of cities were extracted for a ticket purchase, the second static evaluation component 425 recognizes which is a destination and which is a source. Continuing with the example, relational component 425 may search real time database 445 for a predefined grammar line or utterance for example in the form String/s <ParameterType X> String/s→[Arg A]; String/s <ParameterType X> String/s→[Arg b]" which means that when a parameter value of types "ParameterType X" is extracted, the parameter value will be matched with the arguments A and B required by the subcategory value according to the String/s in its context. In this example: "From <ParameterType: City>→Arg: SourceCity; To <ParameterType: City>→Arg: DestCity", allows the extracted city following the word "from" to be recognized as the source city and the extracted city following the word "to" to be recognized as the destination city.

A third specific static evaluation component 425 is employed in step 742. This third evaluation component 425 checks if parameter values corresponding to all parameter types defined for the subcategory value were extracted (step 745). For example third evaluation component 425 can use a check list against the parameter types predefined for the sub-category value in real time database 445. Continuing with the example, if no parameter values were extracted for certain parameter types defined for the subcategory value, third component 425 can check if there are default parameter values which can be assigned or if the parameter types with missing parameter values are optional. Still continuing with the example, if no parameter value or if more than one parameter value was extracted for a mandatory parameter type (as pre-defined) which requires one parameter value and has no default value, then dialoging occurs.

If dialoging is required dialog management module 440 is employed (step 750 corresponding to step 545). Parameter values classifier 420 and/or one or more parameter values pseudo classifier(s) 425 is again employed to evaluate the response (step 752 corresponding to step 520). Alternatively, if the response is obvious and does not need to be understood (for example the response is a selection of a multiple choice option) then parameter values classifier 420 does not need to be employed to check the response and step 752 may be skipped. Third static evaluation component 425 is again employed in step 742.

Examples of when the dialoging of step 750 need not occur include inter-alia, when the correct number of parameter values for the parameter types required by the subcategory value were extracted, when the subcategory values requires no parameter types, and when the parameter types required by the subcategory value have default values.

After action resolver 410 finishes the sequence of employment of the various modules, for example as illustrated in FIG. 7, there should the sufficient results to understand the text (corresponding to a 'yes' answer to step 535). Optionally, a weighted grade can first be evaluated (step 680) as a final test that the results are sufficient.

Note that the three specific evaluation static components 425 mentioned here are separated in the description for ease of understanding and in alternative preferred emboidmnets may be combined into less or separated into more than three modules.

Figure 8:
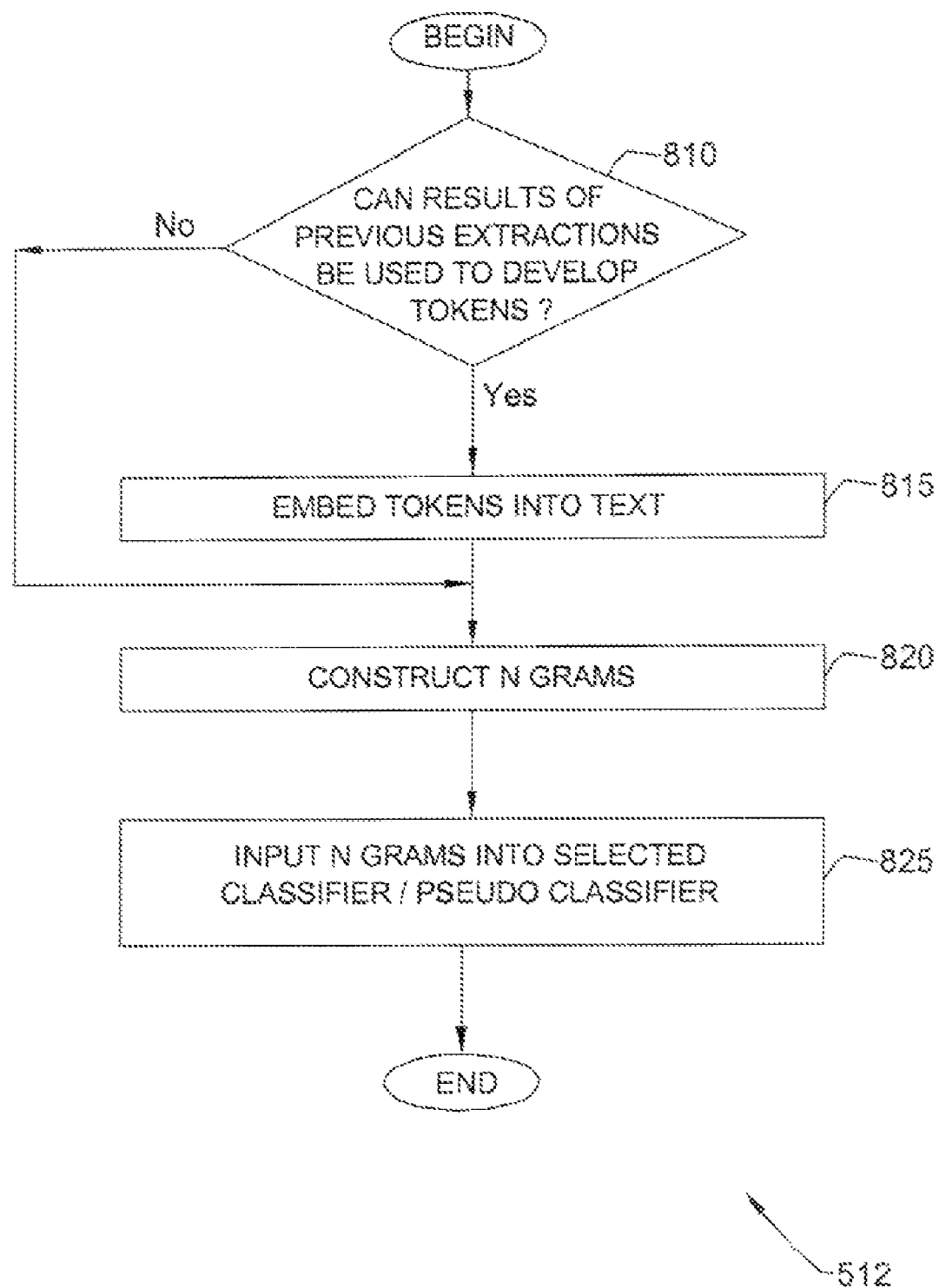
FIG. 8 is a flow chart for preparing a text for extraction, according to a preferred embodiment of the present invention.
Figure 9:
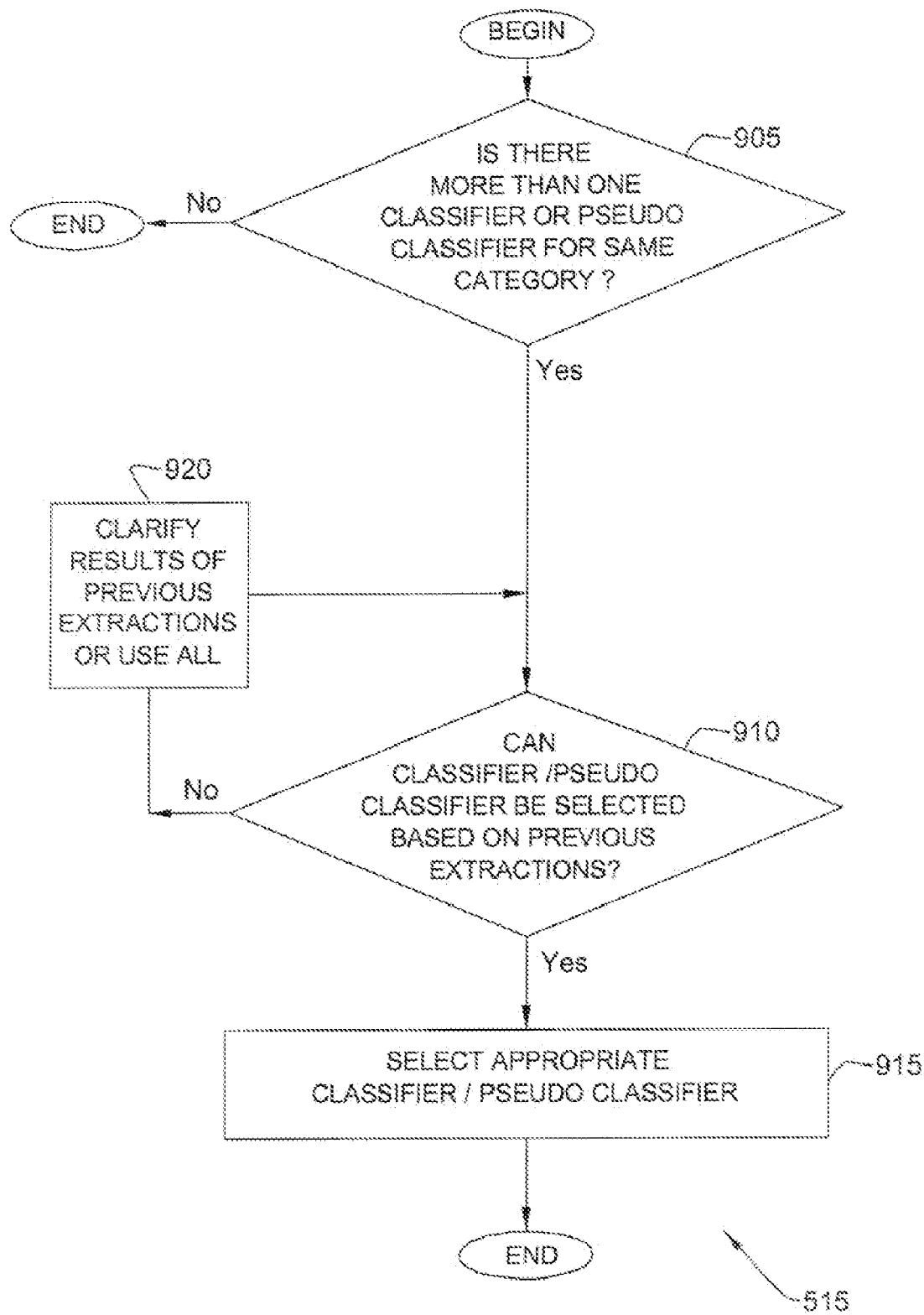
FIG. 9 is a flow chart for selecting a classifier or pseudo classifier based on previous extraction results, according to a preferred embodiment of the present invention.
Figure 10:
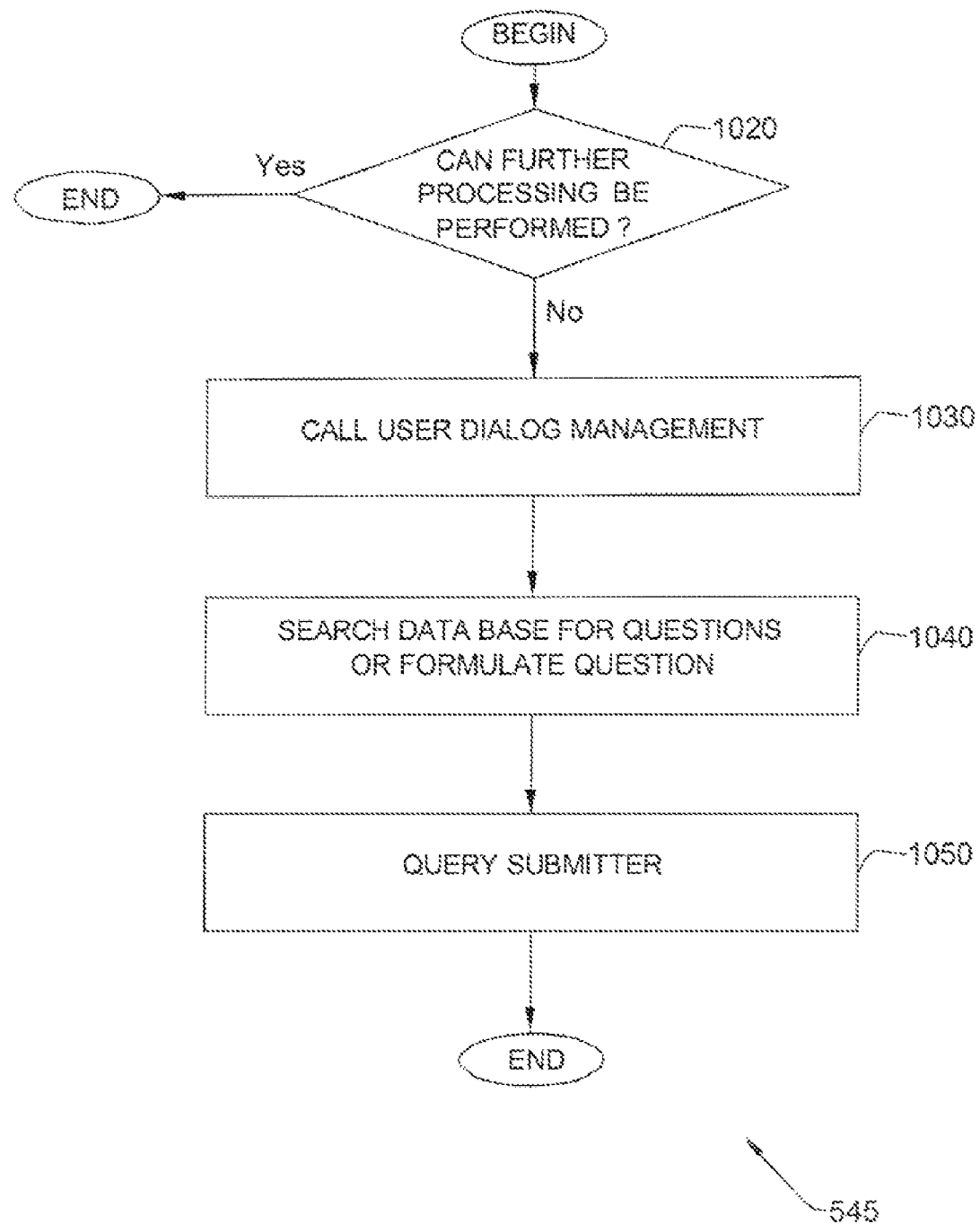
FIG. 10 is a flow chart for interaction with the submitter of a natural language text, according to a preferred embodiment of the present invention.

One of the distinct advantages of the preferred embodiments of the present invention are the one or more dynamic aspects of the natural language understanding. Later steps of the process are adaptable based on the results of earlier steps. The methods illustrated in FIGS. 8, 9, and 10 each include steps which are influenced by the results of the previous steps. Each of the dynamic aspects illustrated in FIGS. 8, 9, and 10 can be separately implemented, and one or more of the dynamic aspects constitutes a separate preferred embodiment. In FIG. 8, the results of a previous extraction may be used to develop tokens that may be embedded in the text used as an input for the next extraction(s). The tokens become part of the input for the next extraction(s) and are therefore termed syntactic tokens. In FIG. 9, more than one extractor 420 or more than one pseudo extractor 425 is available for the same semantic category and the selection of extractor 420 or pseudo extractor 425 depends on the results of previous extractions. In FIG. 10, the dialog with a submitter can vary based on the results (including unsuccessful or no results) of previous extractions.

FIG. 8 illustrates a preferred embodiment of a method for preparing the natural language text for extraction (step 512). The first step is to determine if the results of one or more previous extractions (by either classifiers 420 or pseudo classifiers 425) can be used to develop one or more syntactic tokens (step 810). This step is only performed during certain subsequent extractions and not for the first extraction.

If one or more syntactic tokens can be developed, the tokens are embedded into one or more restatements of the text (step 815), thereby allowing results of previous extractions to directly influence subsequent extractions. Depending on the embodiment, in the restatement of the text the embedded tokens can either replace the text parts which serve as sources for the tokens, or the tokens can supplement those text parts. In certain preferred embodiments, action resolver 410 is responsible for embedding the tokens, but in other preferred embodiments, other modules such as text pre-processing module 435 embeds the tokens.

As an example of a token based on an extracted parameter value, assume the parameter value "crayon" was extracted. A syntactic token of the parameter types (for example "parameter type: writing utensil") corresponding to the extracted parameter value "crayon" may be developed and embedded in the restatement of the text.

N-grams are constructed for the text or the restatements of the text (including embedded tokens) in step 820, if required.

In certain preferred embodiments, n-grams are required for classifiers and some pseudo classifiers but not for all pseudo classifiers. In certain embodiments, text pre-processing module 435 constructs the n-grams.

N-grams are well known in the art. A non-limiting definition for an n-gram based partially on "Text retrieval from Document Images based on N-gram Algorithm", Chew Lim Tan, Sam Yuan Sung, Zhaohui Yu, and Yi Xu available at http:/citeseer.nj.nec.com/400555.html is: An N-Gram is a sequence of N consecutive items of a stream obtained by sliding an N-item wide window over the text one item forward at a time. Every possible N-Gram is given a number, so called the hash key. How the N-Grams are numbered is not important, as long as each instance of a certain N-Gram is always given the same number, and that distinct numbers are assigned to different N-Grams.

Preferably the n-grams are sparse n-grams (i.e. also reflect the distance between words in the text). The use of sparse n-grams in some preferred embodiments of the present invention is advantageous. Sparse n-grams improve the probability of correct natural language understanding because sparse n-grams takes into account the specific order of words in a sentence. In preferred embodiments of the present invention, sparse n-grams are also trained upon (see below discussion with regard to FIG. 12)

As an example, the sparse n-grams used are words, doublets, and triplets in the following form:

$$(w_i w_j w_k, \text{True}) \text{ where } i=j-1=k-2, i=1 \ldots n-2$$

$$(w_i w_j w_k, \text{False}) \text{ where } k>j>i, i=1 \ldots n-2$$

$$(w_i w_j, \text{True}) \text{ where } i=j-1, i=1 \ldots n-1$$

$$(w_i w_j, \text{False}) \text{ where } j>i, i=1 \ldots n$$

Note that in these example following the comma in each sparse n-gram there is a True or False indicator. The True/False indicator can be seen as an "Adjacency" indicator. If the words, doublets or triplets are composed of words which are adjacent in the text, a "True" indicator is indicated in the sparse n-gram. It should be noted that in this example in order to gain flexibility if the doublet or triplet is composed of words which are adjacent in the text, two sparse n-grams are created, one with a "true" indicator and one with a "false" indicator. The added flexibility enables a match between the text after n-grams are generated and the n-grams created for the trained sentence (see below FIG. 12), both if in the trained sentence these words were adjacent or were not adjacent. In this example, if the doublet or triplet is composed of words which are not adjacent in the text, a sparse n-gram with a "false" indicator is created.

The constructed n-grams are used as the input to selected classifier 420 or pseudo classifier 425 (step 825)

In other embodiments of the invention, the construction of n-grams may be skipped (i.e. skip step 820) and the selected classifier 420 and/or pseudo classifier 425 may extract based on other techniques for example by using word spotting.

FIG. 9 illustrates a preferred embodiment of how the results of previous extractions can influence the selection of the next classifier 420/pseudo classifier 425. The method of FIG. 9 may be included in step 515. As mentioned above, in preferred embodiments of the present invention, the sequence of semantic category extractions is preprogrammed. However, in the cases where there is more than one classifier 420 or more than one pseudo classifier 425 for a semantic category, the method of FIG. 9 allows the selection of appropriate classifier 420 or pseudo classifier 425. In step 905, a decision is made on whether more than one classifier 420 or pseudo classifier 425 is available for the semantic category to be extracted, for example by checking the structure of real time database 435. If no, the one available is employed (i.e. proceed directly to step 520). If yes, the method continues with step 910 where a further decision is made whether a selection of less than all available classifier 420 or less than all available pseudo classifier 425 for the semantic category can be made based on previous extractions. If a selection is possible, the selection is made in step 915. Otherwise, results of the previous extractions are clarified in step 920, for example by dialoging with the submitter. In other cases, in step 920, all available classifiers or all available pseudo classifiers for the semantic category are used, for example looking back at FIG. 7 in strep 710 all available parameter pseudo classifiers are initially employed.

As an example, assume that the semantic categories include an overall category and a subcategory and also assume that there is more than one subcategory classifier 420, with a different subcategory classifier 420 used depending on the overall category value. If the results of the overall category extraction are clear, then in step 915 the subcategory classifier 420 corresponding to the extract overall category value is employed. If the results of the overall category extraction are unclear, then clarification is received in step 920.

As another example, assume that there is an additional hierarchical level so that the (four) semantic categories include an overall category, a pre-subcategory, a subcategory and parameter values. In this example a different pre-subcategory classifier 420 is selected depending on the overall category value and a different subcategory classifier 420 is selected depending on the pre-subcategory value. Further added hierarchical levels can be processed in a complementary manner.

As yet another example, assume that there are a plurality of parameter value pseudo classifiers 425. Assume also that in step 745 (FIG. 7) it is found that a certain parameter type, for example a money expression, required by the extracted subcategory value is missing. In this case, a question is asked and once the answer from the submitter is received, only the currency pseudo classifier (corresponding to the missing parameter type) out of all pseudo classifiers 425 would be selected and employed on the answer. As another example, assuming more than two parameter value pseudo classifiers 425, it if is found in step 745 that a money expression and a time expression are missing, then currency pseudo classifier 425 and time pseudo classifier 425 out of all the available pseudo classifiers 425 would be employed on the answer.

FIG. 10 illustrates a preferred embodiment of a method for dialoguing with the submitter of the natural language (step 545). Additional user information may be required for example, to resolve an ambiguity, provide a missing piece of information, or restate the submission. The answers received from the submitter via the dialog augments previous extraction results so as to aid in understanding the natural language text. The term augments is used to include one or more of the following: clarifies, supplements, pinpoints, expands, narrows, etc., i.e. the answers from the dialog allows the text to be better understood than had the dialog not taken place and only the previous extraction results were available.

If further processing can not be performed (step 1020 corresponding to step 540 of FIG. 5, step 718, step 726 or 745 of FIG. 7, or step 920 of FIG. 9) a dialog management module 440 is called by action resolver 420 (step 1030). Ambiguity may result from more than one correct interpretation of a submission (for example, a request for the flight schedules leaving New York City can be interpreted as leaving Kennedy or La Guardia airport and more information from the submitter would be required to resolve the ambiguity). Further processing may also not be possible if information is missing (for example parameter values of all parameter types required by the subcategory value were not extracted). In some preferred embodiments, dialog management module 440 searches real time data base 445 for pre-defined questions associated with one or more categories. In other preferred embodiments, dialog management module 440 does not pose predefined questions, but instead formulates questions. In either case open questions and multiple choice questions may be used according to the type of missing information. In one preferred embodiment, ambiguity problems result in a close-ended question, whereas missing information (for example values of missing categories) result in open-ended questions. In step 1050, the question is posed to the submitter.

In preferred embodiments of the present invention, there is no need to design in advance a dialog tree which covers all possible questions for all possible missing information/ambiguities. Instead dialog is created on the fly or predefined question strings are retrieved from real time database 445 based on system logic previously inserted in real time data base 445. The decision as to what and when to ask if taken by dialog management module 440 based on this system logic and the current step in the understanding process of FIG. 5. The system logic should be understood to mean logic inputted into real time database 445 to aid in the natural language understanding and which as a bonus also aids in question formulation/question string retrieval. For example, the logic for a subcategory value can include the parameter types related to that subcategory value, characteristics of these parameter types independently and in relation to one another (such as when the types are mandatory), relative importance of each of these parameter types, etc.

In preferred embodiments of the present invention, the question posed to the submitter is varied based on previous extraction results (where results in this context can also include non-results i.e. unsuccessful extraction). For example when formulating a question, the previous extraction results can be compared to the logic in order to formulate an appropriate question. Continuing with the example of the previous paragraph if parameter values for two parameter types related to the subcategory value are missing but the logic dictates that one type is more important, then a first question formulated and posed to the submitter may relate only to the more important type. As another example, a pre-defined question may include all required parameter types for a given subcategory according to the logic. However the question strings retrieved from database 445 and used in the question posed to the submitter will relate only to those parameter types with no previously extracted parameter value. As another example, a pre-defined question may include all possible airports in New York State, but if the previous extractions extracted New York City, the multiple-choice question posed to the submitter will be modified so as to offer as possible responses only airports in New York City.

Real time database 445 includes entries for the semantic categories. As mentioned above, real time database 445 in some preferred embodiments also includes dialog questions and/or suggested answers.

There will now be explained a structure for real time database 445, according to a preferred embodiment of the present invention, which assumes a hierarchical structure to semantic categories. Refer to FIG. 11 showing an entity-relationship (ER) diagram of database 445. The entries in database 445 are divided into four types. The first type includes entries related to the semantic category "overall category" 1105. The second type includes entries related to the semantic category "subcategory" 1115. Each overall category entry 1105 has a number of subcategory entries 1115. Each subcategory entry 1115 requires or accepts certain parameter type entries 1125. Each parameter type entry 1125 is able to take on one or more parameter value entries 1135. The parameter value entries 1135 are related to the semantic category "parameter values". The invention is not bound by the illustrated ER structure or contents.

It should be noted that although parameter value entries 1135 are not stored under subcategory entries 1115 in the illustrated example of database 445, parameter values under a common conceptual view would be considered to be of a lower hierarchical level as explained above. For convenience, in the illustrated example of database 445, parameter value entries 1135 in database 445 are not stored under subcategory entries 1115 so that the same parameter value entry 1135 can relate to more than one subcategory entry 1115. It should also be noted that in many preferred embodiments, not all parameter values related to parameter type entries 1125 are stored as parameter value entries 1135 in database 445. For example a particular subcategory entry 1115 may be associated with a parameter type entry 1125 (for example date) whose parameter values are extracted by pseudo classifier 420 and therefore are not stored as entries in database 445.

The definition of the hierarchical structure of database 445 and the characterization of the entries into the different hierarchical levels is typically performed by a system analyst with knowledge of the requirements of a particular implementation and is therefore beyond the scope of this invention.

In some preferred embodiments, entries for one or more categories are manually entered in database 445. In other preferred embodiment, entries for one or more categories can be at least partially automatically gathered from the Internet, preferably using active browsing studio work tool 170. In preferred embodiments including request implementation through control of internet sites, this approach implies that at least part of the information used in building data base 445 originates from the medium where request implementation takes place.

Figure 11:
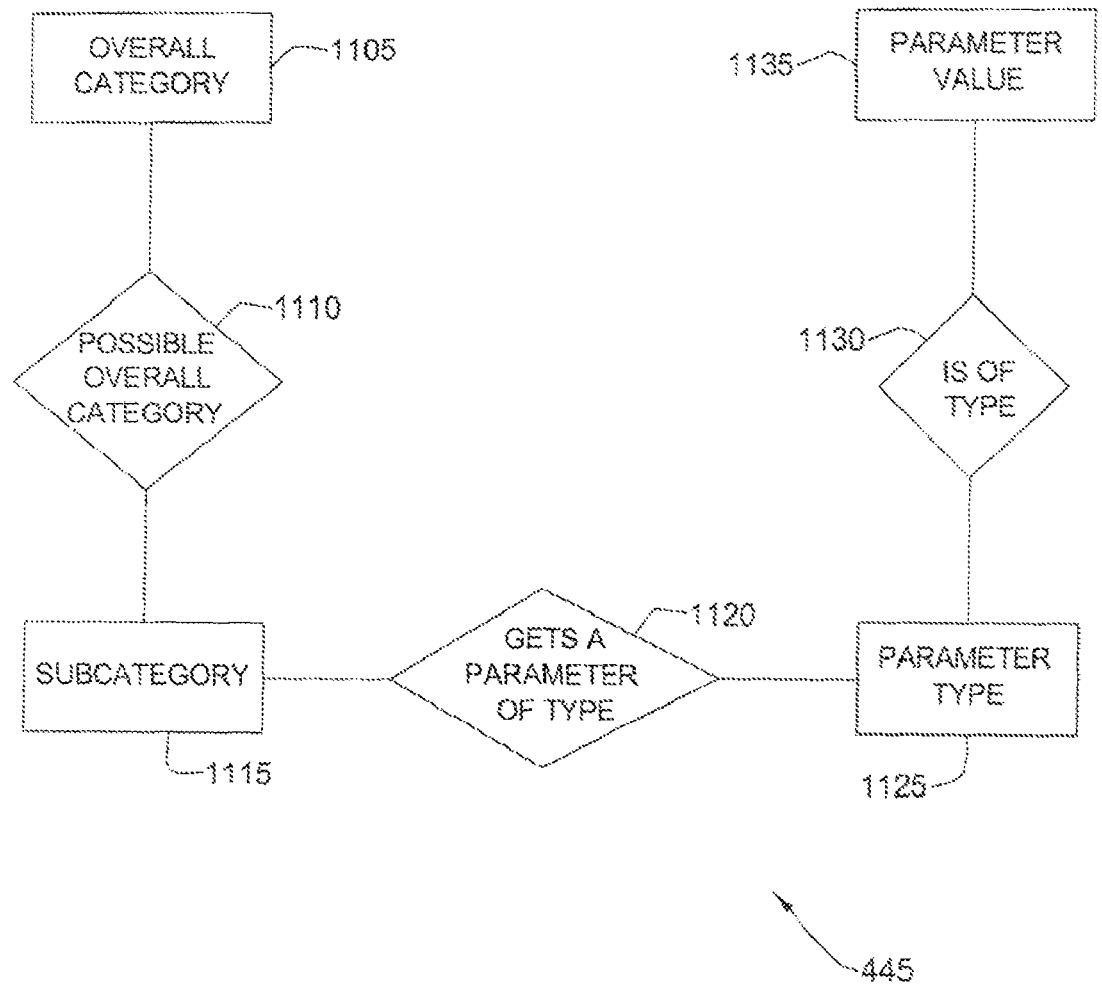
FIG. 11 is an entity-relationship (ER) diagram of a real time database, according to a preferred embodiment of the present invention.
Figure 12:
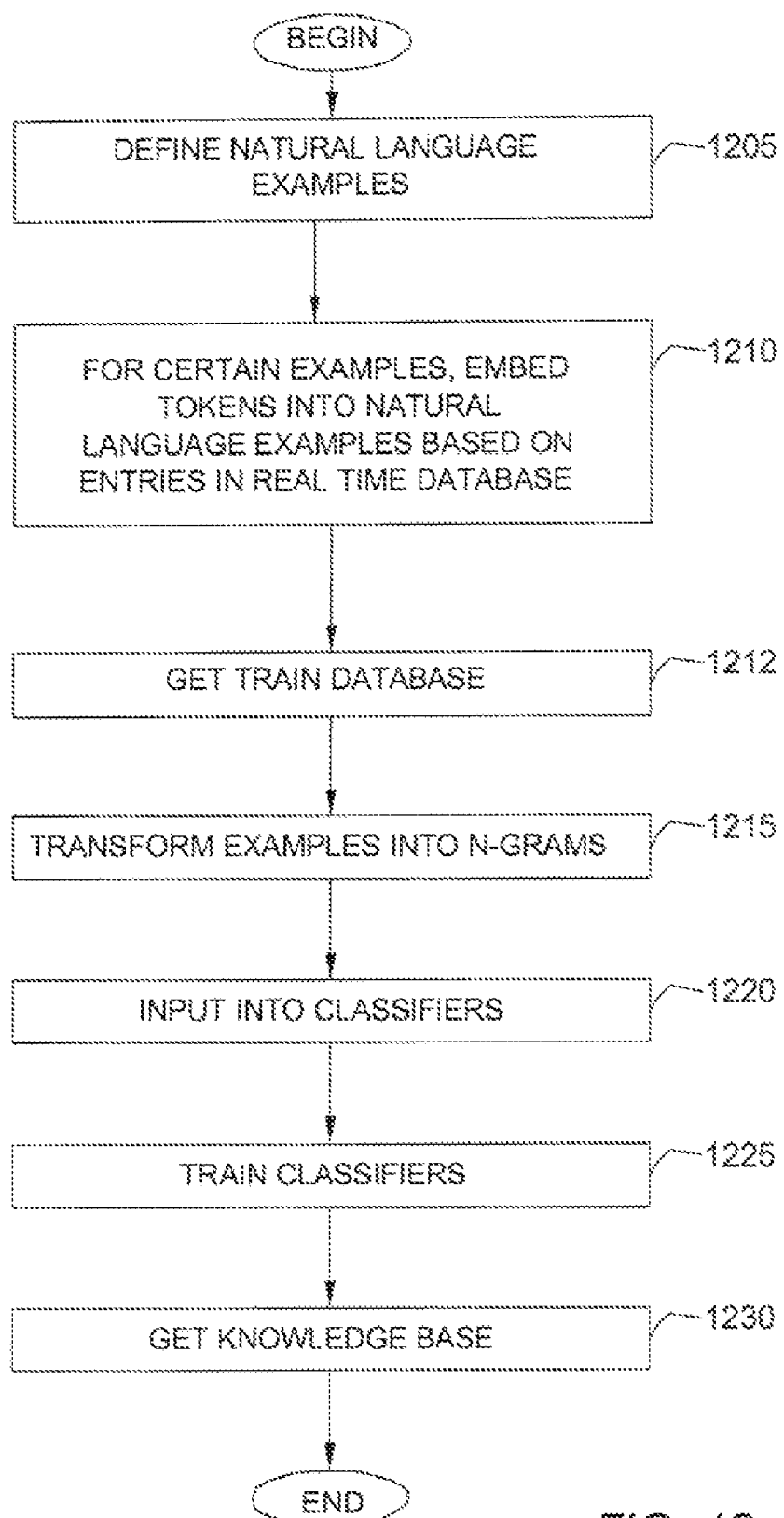
FIG. 12 is a flow chart of a method for training a natural language module, according to a preferred embodiment of the present invention.

FIG. 12 shows a method for training real time database 445 so as to generate knowledge base 430 (used by classifiers 420), according to a preferred embodiment, which assumes the same semantic categories as in FIG. 11. The first step 1205 is the defining of natural language examples. The second step 1210, if required, for some examples, is the embedding of syntactic tokens based on entries in real time database 445 within the natural language examples. Tokens for example can include overall category entries 1105, subcategory entries 1115, parameter type entries 1125 and/or parameter values entries 1135. Train database 450 preferably includes some examples with embedded tokens and some examples without embedded tokens (step 1212), so that classifiers 420 are trained to understand both text which includes proper nouns (for example, Intel) and/or common nouns (for example, stocks). The next step 1215 is the transformation of the examples into n-grams, preferably sparse, if required (for example if it is expected that in operation the extraction will be performed on n-grams). In some preferred embodiments, the transformation is performed by pre-processing module 435. The examples, in the form of n-grams if required, are input into classifiers in 420 step 1220. In one preferred embodiment examples with embedded tokens corresponding to parameter type entries 1125 are used for training classifiers 420 for the overall category and subcategory. In one embodiment, examples with embedded tokens corresponding to parameter value entries 1135 are used for training classifiers 420 for parameter values. The classifiers are trained in step 1225. It should be evident that the same algorithm referenced above with respect to classifiers 420 can be used in training step 1225. Knowledge-base 430 is obtained from the training in the final step 1230. In one preferred embodiment, knowledge-base 430 is a data structure that is saved to a disk so knowledgebase 430 can be used later.

In certain preferred embodiments, knowledge work tool 150 assists in the training process. For example, once an operator of the training has chosen an entry from database 445 and the placement of a token in an example, tool 150 can develop a token from the entry and embed the token in the correct place. As an additional example, work tool 150 can employ pre-processing module 435 for developing n-grams. In certain preferred embodiments, work tool 150 also operates the training of classifiers 420 and saves the results in knowledgebase 430.

In some preferred embodiments, the training phase of knowledgebase 430 is completely separated from the usage phase—i.e. all training is performed prior to use of knowledgebase 430. In other preferred embodiments, knowledgebase 430 continues to be expanded during the usage phase, by learning from the text received from submitters.

An example will now be given to further illustrate certain aspects of the overall process of FIG. 5 and the sub-process of FIGS. 6 to 10. Assume a user submission of "price for Columbia yesterday" received in step 510. The submission in the example includes a request. The text is prepared for extraction in step 512 by constructing the following n grams (step 815). In the example, it is assumed that the n grams are sparse and comply with the exemplary form defined above with reference to FIG. 8:

(price for Columbia, True)
(for Columbia yesterday, True)
(price for Columbia, False)
(for Columbia yesterday, False)
(price for yesterday, False)
(price Columbia yesterday, False)
(price for, True)
(for Columbia, True)
(price for, False)
(for Columbia, False)
(Columbia yesterday, False)
(price Columbia, False)
(price yesterday, False)
(for yesterday, False)
(price, True)
(for True)
(Columbia, True)
(yesterday, True)

Action resolver 410 selects one classifier 420 to employ in step 515. In this case it is assumed that there are three types of classifiers 420: one overall category classifier (the domain of interest); a subcategory classifier corresponding to each overall category value (requested operation for the domain of interest); and one parameter value classifier (items required by operation). Parameter values classifier 420 and all available parameter value pseudo classifier(s) 425 are employed in step 520. The parameter values pseudo-classifier 425 which is a time phase extractor extracts one item: Feb. 6, 2001 i.e. the date yesterday. The parameter type of Feb. 6, 2001 is identified as date. The parameter values classifier 420 extracts items from the word "Columbia" along with the grades of the items (steps 610 and 620). Real time database 445 is used to identify the parameter-types i.e. item-types of the different items extracted from the word Columbia. Assume that five items are extracted corresponding to Columbia as a country, a university, a hospital, and twice as a stock. Due to the ambiguity, more than one item and the corresponding item type are saved.

The text is prepared for the next extraction in step 512, using all possible item-type matches. The syntactic tokens (in this example, the item types) are embedded into the text in step 815. In these example, it is assumed that an identical item-type is embedded in only one restatement of the text, even if more than one item was found of the same item-type (in this example, the tokens supplement "Columbia").

price for Columbia <parameter type:hospital> yesterday <date>
price for Columbia <parameter type:country> yesterday <date>
price for Columbia <parameter type:university> yesterday <date>
price for Columbia <parameter type:hospital> yesterday <date>

Sparse n-grams are constructed in step 820 for each of the four item-type matches (which now include the embedded tokens). It should be noted that when constructing the sparse n-grams the embedded tokens are treated as if the tokens are words and an integral part of the text. Action resolver 410 employs domain extractor 420 on the new sparse n-grams in step 825. Results are evaluated in step 525 (see method of FIG. 6). It is assumed that two possible domains are outputted in step 610. The first domain is hospital policies (i.e. prices for a stay at Columbia Hospital) and the second domain is Nasdaq (the market where the stocks for Columbia Records and Columbia Hospital are listed). It is assumed that the second domain is outputted with a higher grade in step 620. However it is also assumed that the grades are close enough that action resolver 410 decides to approach the submitter (step 545). Dialog management module 440 is called (step 1030) which in this example searches real time database 445 for a question (step 1040). In this example, the question and answers (adapted to the two possible extracted domains) are "Please clarify the topic of interest a) the hospital policies of Columbia Hospital, b) The stock results of Columbia Hospital or, c) The stock results of Columbia records. The question is posed to the submitter in step 1050. The user response is assumed to be "hospital stock" implying the stock results of Columbia Hospital (step 550), which is inputted into domain classifier 420 (step 520) to extract Nasdaq.

Therefore the operation extractor 420 related to Nasdaq is selected in step 915 and employed in step 520. The sparse n-grams earlier derived from:

price for Columbia <parameter type:stock> yesterday <date> are inputted into the operation extractor 420 related to Nasdaq. The results of the operation are "get stock price". The operation is evaluated in conjunction with previous results in step 658. The operation "get stock price" requires parameters of type stock and date. Both of these types have been extracted. As a final test a weighted grade is calculated which is assumed to be sufficiently high (steps 660 and 665). The request is therefore assumed to have been correctly understood (i.e. sufficient results·step 670) and the results are output in step 530.

In order for the request to have been correctly understood, it is assumed that classifiers 420 had been previously trained. As an example, assume that the following examples were defined in step 1205:

"I want a price for <parameter type:stock> at <date:exact date>" This example in which parameter-type tokens were embedded in step 1210 may have been transformed into n-grams in step 1215 and used to train domain classifier 420 for the Nasdaq domain and/or operation classifier 420 for the operation "stock quote" in step 1225.

"I want to trade with stocks" This example with no embedded tokens may have been transformed into n-grams in step 1215 and used to train domain classifier 420 for the Nasdaq domain (and possibly other domain stock markets).

"University Columbia of New York" may have been used to train parameter values classifier 420 for the item Columbia University of New York.

"Columbia Medical" may have been used to train parameter values classifier 420 for Columbia Hospital corresponding to both hospital parameter type and stock parameter type.

To further illustrate the flowcharts of FIGS. 6, 7, 8, 9, 10, and 12 another comprehensive example is presented. In the example, there is assumed to be two possible overall category values (here domains), "financial information" and "car rentals". Subcategory values (here operations) for "financial information" are "get stock quote", "get stock rate of change", "get stock high value", and "get stock low value", each of which is associated with a parameter value of parameter type "stock". There is assumed to be two subcategory values for "car rentals", namely "get address of dealership" which is associated with a parameter value of parameter type location and "make a car rental reservation" which is associated with parameter values of parameter types "location", "time", and "car group, where two locations are required; pickup and return and two times are required pickup time and return time. It is also assumed that parameter values of parameter type "stock" include Intel, Yahoo, Microsoft, AT&T, etc. Parameter values of parameter type "location" as in Avis dealership location include Los Angeles airport, Los Angeles downtown, San Franciso, Sacramento, etc. No specific time parameter values are specified for the "time" parameter type, Parameter values of parameter type "car group" as in rental car group include compact, sub compact, sports, 2-door, etc.

The table below summarizes the scope of the example:

| Overall Category (domain) | Subcategory (operation) | Parameter Types (arguments) |
|---|---|---|
| Financial Information | Get Stock Quote | Stock |
|  | Get Stock Rate Of Change | Stock |
|  | Get Stock High Value | Stock |
|  | Gel Stock Low Value | Stock |
| Car Rentals | Get address of dealership | Location |
|  | Mate Car Rental Reservation | location (pickup) |
|  |  | location (return) |
|  |  | Time (pickup) |
|  |  | Time (return) |
|  |  | Car Group |

| ParameterType | ParameterValues |
|---|---|
| Stock | Intel Yahoo, Microsoft, AT&T, . . . |
| Location (Avis Dealership) | LA Airport, LA Downtown, San Francisco, Sacramento, . . . |
| Time | No specific Items |
| Car Group (rental) | Compact, Sub Compact, Spats, 2-Door, . . . |

Referring to FIG. 6, assume that the text in this example is the request "get a quote for Intel". In steps 610 to 640, the parameter values extracted by parameter value classifier 420 and/or parameter values pseudo classifier 425 are output. In this example, only one parameter value "Intel" is extracted. In step 645, as this is the first semantic category extracted, the results are insufficient.

Assume that the overall category classifier 420 is then called and applied to n-grams created from a restatement of the original text which includes a token based on the results of the parameter value extraction, i.e. "Get a quote for <ParameterType: Stock>" (in this example the token replaces "Intel"). In steps 610 to 640, the outputted results of overall category classifier 420 are the two possible domains, with financial information receiving a high grade and car rentals a low grade. The results are sorted by grades in step 640 and in step 655, the results are evaluated in conjunction with the parameter value results. As the subcategory value is still unknown, the results are considered insufficient.

Assume then that the subcategory classifier 420 corresponding to overall category value "financial information" is called in steps 610 to 658. The results include the operation with the highest grade, assumed to be "Get Stock Quote". The results are checked for compliance with previous results. The evaluation shows that the highest graded operation is a member of the found domain and that the found parameter value is of a type accepted by the found operation as an argument. In step 660 a weighted grade corresponding to the highest graded operation is calculated by a simple formula giving equal weights to each semantic category and the weighted grade is checked to see whether the weighted grade is above a given threshold. If the weighted grade is below the threshold, in step 675 evaluation can be attempted for other sets of results with lower grades (for example including a lower graded operation), and it can be checked whether the resulting weighted grade is higher than the given threshold.

Referring to FIG. 7, assume that the text in the example is instead the request "rent a car tomorrow morning in LA airport until March 13th at noon, return to Sacramento"

In step 702 the text is preprocessed into n-grams because in this example it is assumed that n-grams are inputted to classifiers 420 and/or pseudo classifiers 425. The n-grams are of the sparse form described above with reference to FIG. 8.

In steps 705 to 715 parameter values classifier 420 and pseudo classifiers 425 are initially called. The extracted parameter values include several values: LA Airport, Feb. 8, 2001 08:00 (Tomorrow's date), Mar. 13, 2001 12:00, and Sacramento. The text is restated so as to include tokens based on the found parameter values, namely: "rent a car <ParameterType:Time> in <ParameterType:AvisDealershipLocation> until <ParameterType:Time> return in <ParameterType:AvisDealershipLocation>. New n-Grams are created from the restated text again using the sparse n-gram form described above with the embedded tokens treated as words. Overall category classifier 420 is called and extracts the car rentals domain.

In step 718 because the overall category was unambiguously found the method proceeds with step 722. (If there had been ambiguity with regard to the domain, dialoging with the user could take the form of posing a closed multiple choice question to the submitter which includes the two possible domains as choices.)

In steps 722 to 725, subcategory classifier 420 is called. First evaluation static component 425 is then called in order to try to find a match between the parameter types of the found parameter values and the expected arguments of the highest graded extracted operation. In this example, because the request text is clear regarding the desired operation, subcategory classifier 420 returns only one operation. Static evaluation component 425 matches the parameter types "Time" and "AvisDealershipLocation" corresponding to the extracted parameter values with the corresponding arguments of the "Make Car Rental Reservation" operation.

Because the subcategory value was unambiguously found, no dialoging is required and the method proceeds with step 735 (If these had been ambiguity, a typical multiple choice question could display as choices all available operations for the found domain or all operations for the found domain which received a high grade from subcategory classifier 420)

In steps 735 to 740 because there are parameter types which are acceptable for more than one argument of the found operation, there is a need to call second static evaluation component (Relational Static Component) 425. In this example both Time and AvisDealershipLocation are twice accepted as arguments by the operation "make car rental reservation". Relational static component 425 identifies which values belong to which arguments by checking the context of the values. The time value Mar. 13, 2001 12:00 is recognized as the return time due to the preceding word "until", and the value Sacramento is recognized as the return location by the preceding words "return to". Once these values are assigned correctly to the arguments of the operation the other time and AvisDealershiplocation values follow naturally.

In steps 742 to 752 third static component 425 is called to check if all required arguments have been assigned suitable values. In this example third static component 425 finds that four out of the five arguments have values assigned. The car group argument is as yet unassigned. Therefore in step 750 in a dialog with the submitter either an open question is posed to prompt the submitter to enter the car group or a closed question is posed including as choice all possible car groups (as predefined). Once the answer is received, the last required parameter is known and results can be output.

Referring to FIG. 8 it is assumed that the text is the same request as in FIG. 7, namely "rent a car tomorrow morning in LA airport until March 13th at noon, return to Sacramento". Step 810 checks if there are any previous results that can be developed into tokens. In this example tokens for parameter types Time and AvisDealershipLocation which correspond to the extracted parameter values can be developed. A token is developed for each text part that had been used as a source for extraction of a parameter value.

In step 815 the developed tokens are embedded in the text in place of the source texts that were used to extract the parameter values. In this example the restatement of the original request "rent a car tomorrow morning in LA airport until March 13th at noon, return to Sacramento" is restated as "rent a car <ParameterType:Time> in <ParameterType:AvisDealershipLocation> until <ParameterType:Time> return to <ParameterType:AvisDealershipLocation>".

In steps 820 to 825 from the restatement, new n-grams are constructed in the sparse n gram form described above with reference to FIG. 8. Some of the n-Grams include tokens, which are dealt with as regular words.

Refer now to FIG. 9. Again assume the text is the request "rent a car tomorrow morning in LA airport until Mar. 13th at noon, return to Sacramento" In step 905 the answer to the question is yes when deciding whether there is more than one possible subcategory classifier 420 which can be called. In this example, a selection needs to be made from among the two possible subcategory classifiers 420, one that classifies operations for the Financial Information domain and one that classifies operations for the Car Rentals domain.

In steps 910 to 920 because the domain "car rentals" is assumed to have already been found, the car rentals subcategory classifier 420 is used. (If after using the overall category classifier there is still ambiguity with regard to the correct domain, dialoging in step 920 would be attempted to clarify the correct domain)

Refer to FIG. 10. Assume now that there are two texts received from the submitter the first text being "LA Airport to Sacramento, tomorrow morning until Mar. 13, 2001 at noon" and the second text being "Intel".

In step 1020 redundant interactions with the submitter are avoided by performing additional automatic processing to try to solve any problems without the help of the submitter. Assume that the parameter values (LA airport, Sacramento, Feb. 8, 2001 08.00, and Mar. 13, 12.00) and domain (car rentals) have been extracted from the first text. Although the operation is not given in the first text, further processing can be performed using the first static evaluation component 420 in order to determine the desired operation by looking at the parameter types of the extracted parameter values and comparing these parameter types with the possible accepted arguments of the available operations, thereby avoiding dialoging. However, after calling second and third static components 420 the car group value is still missing and so dialoging with the submitter is required to obtain the car group value. Referring now at the second text, both the overall category and the subcategory can not be extracted based on the text alone. However, the overall category can be extracted from a restatement which includes a token based on an extracted parameter value, i.e. (<parameterType:Stock>). This restatement implies that the desired operation to be found accepts the stock parameter type as an argument. In this example, only operations in the financial information domain (and not in the car rental domain) receive such values. Therefore the domain can be determined without dialoging. However, after calling the subcategory classifier, the operation is still ambiguous because all four operation in this domain accept stock as an argument. Therefore dialoging with the submitter is required to allow the submitter to select the correct operation.

In step 1030 to 1050 dialog management module 440 is called if no further processing is possible. Dialog management module 440 generates the correct interaction based on the current status of the handling of the request. If dialog management 440 is called while processing the first text to determine the car group value, dialog module 440 need to create an interaction for determining the car group parameter value. Therefore dialog module 440 goes to real time database 445 and finds the string that was prepared as a question for this case specifically, i.e.—a question regarding the lack of value for this specific argument. If dialog module 440 is called for the second text in order to determine the operation, dialog module 440 needs to create an interaction that clarifies an ambiguity in the operation and presents the submitter with all possible options. Therefore, dialog module 440 goes to real time database 445 and finds the String that was prepared for this specific case, i.e.—operation ambiguity interaction. Once the question is formatted, the question is transferred to the submitter and the reply of the submitter is analyzed.

Refer to FIG. 12. In this example, the initial creation of knowledge base 430 includes the following steps. In step 1205, natural language examples are defined for the supported domains, operations and parameter values. For example, the following examples may be used, inter-alia for training:

"I want to receive financial information"→Domain:Financials

"I want to get a stock quote"→Operation:Get Stock Quote

"I would like to rent a car"→Domain:Car Rentals

"I would like to rent a car"→Operation:Make Car Rental Reservation

"Intel"→Parameter value:Intel

"Los Angeles Airport"→Parameter value: LA Airport

In step 1210 tokens are embedded in some of the above examples. For example:

"I want to get a stock quote for <ParameterType: Stock>"→Operation:Get Stock Quote "I would like to rent a car <ParameterType:Time> in <ParameterType:AvisDealershipLocation>"→Domain:Car Rentals In steps 1212 to 1230 the training examples are turned into n-Grams, and the classifiers are trained on the n-grams, with the results serialized into Knowledgebase 430. Typically, the training process is classifier-specific allowing the examples in their n-gram representation to be associated with the categories and values which were trained on those n-grams.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

While the invention has been described with respect to a limited number of embodiments, it will be appreciated that many variations, modifications and other applications of the invention may be made.

The invention claimed is:

1. A computer-implemented method for causing a computer to understand a natural language text, the method comprising causing the computer to execute steps of:

receiving a natural language text;

extracting at least one parameter value from said natural language text or a form thereof;

identifying at least one parameter type related to each extracted parameter value;

providing at least one restatement of said natural language text, each at least one restatement having, embedded within, at least one of said identified parameter types;

extracting at least one overall category value from said at least one restatement or a form thereof;

selecting a subcategory extractor corresponding to one of said extracted at least one overall category, and using said selected subcategory extractor to extract at least one subcategory value;

choosing one of said at least one extracted subcategory values; and evaluating said at least one identified parameter type in relation to said chosen subcategory value.

2. The method of claim 1, further comprising:

providing at least one n-gram from said natural language text, wherein said extracting at least one parameter value from said form comprises extracting from said at least one n-gram; and providing a set of at least one n-gram for each at least one restatement, wherein said extracting at least one overall category from said form comprises extracting from said sets of said at least one n-gram.

3. The method of claim 2, wherein said n-grams are sparse n-grams.

4. The method of claim 1, wherein said at least one overall category value is a domain, and said at least one subcategory value is an operation.

5. The method of claim 1, wherein said natural language text is understood if one value for said overall category, one value for said subcategory, and any corresponding required parameter values have been determined.

6. The method of claim 1, wherein selecting a subcategory extractor includes:

if at least two overall category values are extracted, selecting one of said at least two overall category values based on associated grades thereof, and using a subcategory extractor corresponding to said selected one overall category value to extract said at least one subcategory value.

7. The method of claim 1, wherein at least two overall category values are extracted, and wherein selecting a subcategory extractor includes:

asking a question to a submitter of said natural language text;

receiving a response to said question from said submitter;

extracting one overall category value from said response; and using a subcategory extractor corresponding to said extracted one overall category to extract said at least one subcategory value.

8. The method of claim 1, further comprising: if at least one parameter value is extracted which corresponds to a parameter type of which at least two values are defined for said chosen subcategory value, evaluating a relationship between said at least one extracted parameter value and said at least two values defined for said subcategory value.

9. The method of claim 1, wherein choosing one of said at least one extracted subcategory values includes:

evaluating said extracted at least one parameter value in relation to said extracted at least one subcategory value; and if said extracted at least one parameter value does not correspond to one of said at least one extracted subcategory values, asking a question to a submitter of said natural language text;

receiving a response to said question from said submitter;

extracting at least one subcategory value from said response; and evaluating said extracted at least one parameter value in relation to said at least one subcategory value extracted from said response in order to choose one subcategory value from among said extracted subcategory values.

10. The method of claim 1, wherein choosing one of said at least one extracted subcategory values include: if at least two subcategory values are extracted, choosing one of said at least two subcategory values based on associated grades thereof.

11. The method of claim 1, wherein evaluating said at least one identified parameter type in relation to said chosen subcategory value includes:

if said at least one identified parameter type does not correspond to all parameter types required by said chosen subcategory value without default parameter values, asking a question to a submitter of said natural language text;

receiving a response to said question from said submitter, extracting at least one parameter value from said response, evaluating parameter types related to said extracted at least one parameter value in order to achieve identification of said all required parameter types without default values.

12. The method of claim 1, further comprising: asking a question to a submitter of said natural language text, wherein content of said question is dependent on when during said method said question is asked.

13. The method of claim 12, wherein said asking includes: formulating said content on the fly.

14. The method of claim 12, wherein said asking includes: modifying a predefined question to generate said content.

15. The method of claim 1, further comprising concluding, based on a result of the evaluating at least one identified parameter type, if said natural language text is understood.

16. The method of claim 15, wherein concluding comprises concluding that said natural language text is understood if the at least one identified parameter type corresponds to all required parameter types for said chosen subcategory value.

17. The method of claim 15, wherein concluding comprises concluding that said natural language text is understood if the at least one identified parameter type corresponds to all required parameter types with non-default parameter values for said chosen subcategory value.

18. The method of claim 1, further comprising determining an action based on an understanding of the natural language text.

19. The method of claim 1, further comprising taking an action based on a result of the evaluating at least one identified parameter type, wherein the action is determined by an understanding of the natural language text.

20. A computer-readable medium having encoded thereon instructions for causing a computer to understand a natural language text, said instructions, when executed by the computer:

cause the computer to receive a natural language text;

cause the computer to extract at least one parameter value from said natural language text or a form thereof;

cause the computer to identify at least one parameter type related to each extracted parameter value;

cause the computer to provide at least one restatement of said natural language text, each at least one restatement having embedded within, at least one of said identified parameter types;

cause the computer to extract at least one overall category value from said at least one restatement or a form thereof;

cause the computer to select a subcategory extractor corresponding to one of said extracted at least one overall category, and use said selected subcategory extractor to extract at least one subcategory value;

cause the computer to choose one of said at least one extracted subcategory values; and cause the computer to evaluate said at least one identified parameter type in relation to said chosen subcategory value.

* * * * *